(12) United States Patent
Dixit et al.

(10) Patent No.: US 11,934,021 B2
(45) Date of Patent: Mar. 19, 2024

(54) PHOTONIC DEVICES INTEGRATED WITH THERMALLY CONDUCTIVE LAYERS

(71) Applicant: GlobalFoundries U.S. Inc., Malta, NY (US)

(72) Inventors: Hemant Martand Dixit, Halfmoon, NY (US); William J. Taylor, Jr., Clifton Park, NY (US); Yusheng Bian, Ballston Lake, NY (US); Theodore Letavic, Putnam Valley, NY (US); Oscar D. Restrepo, Halfmoon, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 57 days.

(21) Appl. No.: 17/649,191

(22) Filed: Jan. 27, 2022

(65) Prior Publication Data

US 2023/0236361 A1  Jul. 27, 2023

(51) Int. Cl.
| | | |
|---|---|---|
| G02B 6/42 | (2006.01) | |
| G02B 6/122 | (2006.01) | |
| G02B 6/125 | (2006.01) | |
| G02B 6/12 | (2006.01) | |

(52) U.S. Cl.
CPC ........... *G02B 6/4269* (2013.01); *G02B 6/122* (2013.01); *G02B 6/125* (2013.01); *G02B 2006/12135* (2013.01); *G02B 2006/12142* (2013.01)

(58) Field of Classification Search
CPC .................. G02B 6/122; G02B 6/125; G02B 2006/12135
See application file for complete search history.

(56) References Cited

U.S. PATENT DOCUMENTS

| | | | |
|---|---|---|---|
| 9,581,761 B2 * | 2/2017 | Liang | G02B 6/122 |
| 10,488,587 B2 * | 11/2019 | Chantre | H01S 5/026 |
| 11,209,673 B2 * | 12/2021 | Lin | G02F 1/0147 |
| 2018/0323575 A1 * | 11/2018 | Caër | H01S 5/02461 |

FOREIGN PATENT DOCUMENTS

| | | | | |
|---|---|---|---|---|
| CN | 107787538 B | * | 11/2019 | ......... C23C 14/3471 |
| EP | 3309911 A2 | | 10/2017 | |
| JP | 2007078861 A | | 6/2018 | |
| JP | 2018092016 | | 6/2018 | |
| WO | 2004036289 A3 | | 4/2004 | |

OTHER PUBLICATIONS

Adil Masood et al., Fabrication and characterization of CMOS-compatible integrated tungsten heaters for thermo-optic tuning in silicon photonics devices, Optical Materials Express, Jul. 2014, pp. 1383-1388, vol. 4—No. 7, OSA.

(Continued)

*Primary Examiner* — Daniel Petkovsek
(74) *Attorney, Agent, or Firm* — Anthony Canale

(57) ABSTRACT

The disclosed subject matter relates to semiconductor devices for use in optoelectronic/photonic applications and integrated circuit (IC) chips. More particularly, the present disclosure relates to photonic devices having thermally conductive layers for the removal of heat from optoelectronic components in the photonic devices.

18 Claims, 23 Drawing Sheets

(56) References Cited

OTHER PUBLICATIONS

Giewont et al., 300-mm Monolithic Silicon Photonics Foundry Technology, IEEE Journal of Selected Topics in Quantum Electronics, Apr. 2019, pp. 1-11, vol. 25—No. 5, IEEE.
Bian et al., Monolithically integrated silicon nitride platform, 2021 Optical Fiber Communications Conference and Exhibition (OFC), Jun. 2021, pp. 1-3, IEEE.
Bian et al., Towards low-loss monolithic silicon and nitride photonic building blocks in state-of-the-art 300mm CMOS foundry, OSA Technical Digest, 2021, OSA.

* cited by examiner

View A-A

View A-A

View B-B

PHOTONIC DEVICES INTEGRATED WITH THERMALLY CONDUCTIVE LAYERS

FIELD OF THE INVENTION

The present disclosure generally relates to semiconductor devices for use in optoelectronic/photonic applications and integrated circuit (IC) chips. More particularly, the present disclosure relates to photonic devices having thermally conductive layers for the removal of heat from optoelectronic components in the photonic devices. The present disclosure also relates to a method of forming the semiconductor devices described herein.

BACKGROUND

Silicon photonics is a platform for potentially revolutionary advances in the fields of telecommunications, data communications, medical technology, security, quantum computing, and sensing. Silicon photonics has the potential to realize small, highly integrated, photonics sub-systems that leverage off the decades of silicon fabrication experience, technology, and scalability to gain access to the full potential of the silicon platform, i.e. silicon photonics for high-speed signaling and sensing, and complementary metal-oxide semiconductor (CMOS) electronics for subsequent logical operations and computations. Such multi-chip integration also allows for the bridging of different functional technologies, such as micro-electro-mechanical systems (MEMS), III-V materials, non-CMOS application-specific integrated circuits (ASIC), etc.

Optoelectronic or photonic devices are types of semiconductor devices that include components capable of at least detecting, transmitting, manipulating, and harnessing electromagnetic energy, such as light. However, the performance of these optoelectronic devices can be temperature sensitive. For example, the components in an optoelectronic device may generate heat during the operation of the device, which causes large temperature variations that may adversely impact the performance of the device (e.g., degradation of the efficiency and reliability of the device).

SUMMARY

In an aspect of the present disclosure, there is provided a semiconductor device including a first thermally conductive layer above a substrate, a second thermally conductive layer above the substrate, in which the first thermally conductive layer and the second thermally conductive layer are electrically isolated. An optoelectronic component is above the substrate, the optoelectronic component is laterally between the first thermally conductive layer and the second thermally conductive layer, and the optoelectronic component is spaced apart from the first thermally conductive layer and the second thermally conductive layer.

In another aspect of the present disclosure, there is provided a semiconductor device including a first plurality of thermally conductive layers above a substrate, a second plurality of thermally conductive layers above the substrate, in which the first plurality of thermally conductive layers and the second plurality of thermally conductive layers are electrically isolated. An optoelectronic component is above the substrate, the optoelectronic component is laterally between the first plurality of thermally conductive layers and the second plurality of thermally conductive layers, and the optoelectronic component is spaced apart from the first plurality of thermally conductive layers and the second plurality of thermally conductive layers, wherein the thermally conductive layers in the respective first and second pluralities are perpendicular to the optoelectronic component.

BRIEF DESCRIPTION OF THE DRAWINGS

The present disclosure may be understood by reference to the following description taken in conjunction with the accompanying drawings.

For simplicity and clarity of illustration, the drawings illustrate the general manner of construction, and certain descriptions and details of features and techniques may be omitted to avoid unnecessarily obscuring the discussion of the described embodiments of the present disclosure. Additionally, elements in the drawings are not necessarily drawn to scale. For example, the dimensions of some of the elements in the drawings may be exaggerated relative to other elements to help improve understanding of embodiments of the present disclosure. The same reference numerals in different drawings denote the same elements, while similar reference numerals may, but do not necessarily, denote similar elements.

FIG. 1B is a cross-sectional view taken along section line AA in FIG. 1A.

FIG. 5B is a cross-sectional view taken along section line AA in FIG. 5A. FIG. 5C is an alternative cross-section view taken along section line AA in FIG. 5A.

FIG. 6B is a cross-sectional view taken along section line AA in FIG. 6A. FIG. 6C is an alternative cross-section view taken along section line AA in FIG. 6A.

FIG. 13A is a top-down view, FIG. 13B is a cross-sectional view taken along section line BB in FIG. 13A, FIG. 13C is a cross-section view taken along section line CC in FIG. 13A, and FIG. 13D is a cross-sectional view taken along section line DD in FIG. 13A.

DETAILED DESCRIPTION

Various illustrative embodiments of the present disclosure are described below. The embodiments disclosed herein are exemplary and not intended to be exhaustive or limiting to the present disclosure.

Figure 1A:
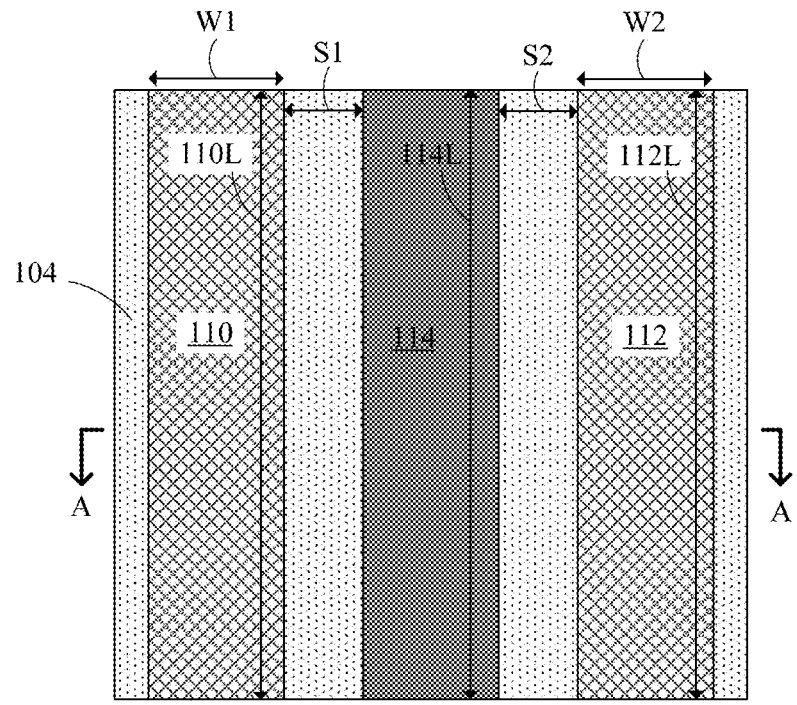
FIG. 1A is a top-down view and FIG. 1B is a cross-sectional view depicting an example of a semiconductor device having thermally conductive layers.
Figure 1B:
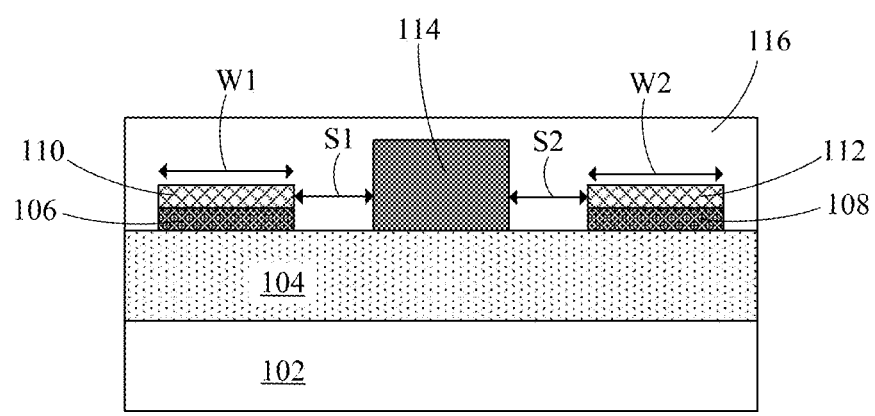

Referring to FIG. 1A and FIG. 1B, a semiconductor device for use in optoelectronic or photonic applications may include a first semiconductor layer 106 above a substrate 102, a first thermally conductive layer 110 on the first semiconductor layer 106, a second semiconductor layer 108 above the substrate 102, a second thermally conductive layer 112 on the second semiconductor layer 108, and an optoelectronic component 114 above the substrate 102.

Examples of the optoelectronic component 114 may include, but are not limited to, photodetectors, waveguides, lasers, and optical modulators. Preferably, the optoelectronic component 114 may be a waveguide. The waveguide 114 may be made of either a semiconductor material or a dielectric material. Examples of the semiconductor material in the waveguide may include, but are not limited to, III-V compound semiconductors, amorphous silicon, polycrystalline silicon, amorphous germanium, polycrystalline germanium, amorphous SiGe, or polycrystalline SiGe. Examples of the dielectric material in the waveguide may include, but are not limited to, silicon nitride (SiN), silicon oxynitride (SiON), aluminum nitride (AlN), or other nitride-containing compounds. Preferably, the waveguide 114 may include a semiconductor material, such as silicon or germanium.

The semiconductor layers 106, 108 may include III-V compound semiconductors, crystalline silicon, amorphous silicon, polycrystalline silicon, crystalline germanium, amorphous germanium, polycrystalline germanium, amorphous SiGe, or polycrystalline SiGe. In some embodiments, the semiconductor layers 106, 108 may include the same material as the optoelectronic component 114.

The optoelectronic component 114 is laterally between the first thermally conductive layer 110 and the second thermally conductive layer 112. The optoelectronic component 114 is also spaced apart from the first thermally conductive layer 110 and the second thermally conductive layer 112. The optoelectronic component 114 may be thermally coupled to the first thermally conductive layer 110 and the second thermally conductive layer 112. The first thermally conductive layer 110 and the second thermally conductive layer 112 may function as thermal conductors that conduct and dissipate heat energy away from the optoelectronic component 114. In some implementations, the inclusion of the thermally conductive layers 110, 112 may reduce the maximum temperature of the optoelectronic component 114 by about 20%. As will be shown in subsequent drawings, the thermally conductive layers 110, 112 may be connected to a heat sink, in which the heat sink absorbs the heat energy conducted by the thermally conductive layers 110, 112.

The thermally conductive layers 110, 112 may include a metal semiconductor compound or a metal. The metal semiconductor compound may include a compound formed from a chemical reaction between a metal and a semiconductor material. Examples of the metal semiconductor compound may include, but are not limited to, metal silicides, nickel silicide, nickel-platinum silicide, cobalt silicide, titanium silicide, metal germanides, nickel germanide, nickel-platinum germanide, cobalt germanide, or titanium germanide. Examples of the metal may include, but are not limited to, copper or aluminum. In some embodiments, the thermally conductive layers 110, 112 may have a thermal conductivity in the range of about 18 W/m-K to about 450 W/m-K, about 18 W/m-K to about 44 W/m-K, about 250 W/m-K to about 450 W/m-K, or about 50 W/m-K to about 250 W/m-K, although other values of the thermal conductivity are contemplated.

The first thermally conductive layer 110 and the second thermally conductive layer 112 are electrically isolated. In other words, the first thermally conductive layer 110 and the second thermally conductive layer 112 do not have any current or voltage passing through them and are not electrically connected to a power supply. If a current or voltage is passed through the thermally conductive layers 110, 112, then heat may be generated within the layers 110, 112, which could reduce the ability or capacity of the thermally conductive layers to dissipate heat energy from the optoelectronic component 114. Thus, the electrical isolation of the first thermally conductive layer 110 and the second thermally conductive layer 112 may advantageously provide a higher capacity of heat removal and better dissipation of heat energy generated from the optoelectronic component 114.

The optoelectronic component 114 may be spaced apart from the first thermally conductive layer 110 by a first spacing S1. The optoelectronic component 114 may also be spaced apart from the second thermally conductive layer 112 by a second spacing S2. In some embodiments, the first spacing S1 may be the same as the second spacing S2. For example, the optoelectronic component 114 may be equidistant from the first thermally conductive layer 110 and the second thermally conductive layer 112. Alternatively, as will be shown in subsequent drawings, the first spacing S1 may be different from the second spacing S2.

If the thermally conductive layers 110, 112 are positioned in direct contact with the optoelectronic component 114, the material in the thermally conductive layers 110, 112 may interfere with the transmission or absorption of the optical signals in the optoelectronic component 114 leading to a loss of optical signals or energy. Thus, the spacing apart of the optoelectronic component 114 from the first thermally conductive layer 110 and the second thermally conductive layer 112 may advantageously reduce the loss of optical signals in the optoelectronic component 114. In examples where the optoelectronic component 114 is a waveguide, the spacing apart of the waveguide from the thermally conductive layers 110, 112 may reduce the waveguide loss. The first spacing S1 and the second spacing S2 may be engineered to maximize the rate of heat dissipation as well as minimize the loss of optical signals. For example, the first spacing S1 and the second spacing S2 may have a distance in the range of about 0.5 micrometers to about 2 micrometers, about 1 micrometer to about 2 micrometers, about 1.5 micrometers to about 2 micrometers, about 0.5 micrometers to about 1.5 micrometers, about 1 micrometer to about 1.5 micrometers, or about 0.5 micrometers to about 1 micrometer.

As shown in FIG. 1A, the first thermally conductive layer 110 and the second thermally conductive layer 112 may be parallel to the optoelectronic component 114. The optoelectronic component 114 may be elongated and have a longitudinal length 114L. In some embodiments, the spacing S1 between the optoelectronic component 114 and the first thermally conductive layer 110 as well as the spacing S2 between the optoelectronic component 114 and the second thermally conductive layer 112 may remain constant along the longitudinal length 114L of the optoelectronic component 114. In other embodiments, as will be shown in subsequent drawings, the spacing S1 between the optoelectronic component 114 and the first thermally conductive layer 110 as well as the spacing S2 between the optoelectronic component 114 and the second thermally conductive layer 112 may vary along the longitudinal length 114L of the optoelectronic component 114.

The first thermally conductive layer 110 may have a width W1 and a longitudinal length 110L. The second thermally conductive layer 112 may have a width W2 and a longitudinal length 112L. The thermally conductive layers 110, 112 may be elongated. In some embodiments, the width W1 of the first thermally conductive layer 110 may remain constant along the longitudinal length 110L of the first thermally conductive layer 110. The width W2 of the second thermally conductive layer 112 may remain constant along the longitudinal length 112L of the second thermally conductive layer 112. In other embodiments, as will be shown in subsequent drawings, the width W1 of the first thermally conductive layer 110 may vary along the longitudinal length 110L of the first thermally conductive layer 110, and the width W2 of the second thermally conductive layer 112 may vary along the longitudinal length 112L of the second thermally conductive layer 112.

As shown in FIG. 1A, the width W1 of the first thermally conductive layer 110 may be the same as the width W2 of the second thermally conductive layer 112. Alternatively, as will be shown in subsequent drawings, the width W1 of the first thermally conductive layer 110 may be different from the width W2 of the second thermally conductive layer 112. The width W1 of the first thermally conductive layer 110 and the width W2 of the second thermally conductive layer 112 may be modified to achieve a desired heat removal rate for the removal of heat energy from the optoelectronic component 114. For example, the provision of wider widths W1, W2 of the thermally conductive layers 110, 112 may enable a higher amount of heat removed from the optoelectronic component 114. The respective widths W1, W2 of the thermally conductive layers 110, 112 may be engineered such that the thermally conductive layers 110, 112 can be structured as elongated layers or plates.

The substrate 102 may be made of any semiconductor material, such as silicon, germanium, silicon germanium (SiGe), silicon carbide, and those consisting essentially of III-V compound semiconductors, such as GaAs, II-VI compound semiconductors such as ZnSe. The substrate 102 may have an amorphous, polycrystalline, or monocrystalline structure. A buried insulator layer 104 may be disposed on the substrate 102. The buried insulator layer 104 may include an oxide (e.g., silicon dioxide, germanium dioxide, etc.) or a nitride (e.g., silicon nitride, germanium nitride, etc.). As shown in FIG. 1B, the optoelectronic component 114 and the semiconductor layers 106, 108 may be disposed on the buried insulator layer 104.

A dielectric cladding material 116 may be formed over the optoelectronic component 114, the semiconductor layers 106, 108, and the thermally conductive layers 110, 112. The dielectric cladding material 116 may be laterally between the optoelectronic component 114 and the first thermally conductive layer 110. The dielectric cladding material 116 may also be laterally between the optoelectronic component 114 and the second thermally conductive layer 112. The dielectric cladding material 116 may function as an interlayer dielectric (ILD) to provide electrical isolation of the semiconductor layers 106, 108 and the thermally conductive layers 110, 112. The dielectric cladding material 116 may be structured as a single layer or as a structure having multiple layers. For example, the dielectric cladding material 116 may include, but is not limited to, oxides of silicon or nitrides of silicon. Heat energy may be transferred, by either conduction or radiation, from the optoelectronic component 114 towards the adjacent thermally conductive layers 110, 112. The heat energy from the optoelectronic component 114 may traverse through the dielectric cladding material 116 between the optoelectronic component 114 and the respective thermally conductive layers 110, 112 before reaching the thermally conductive layers 110, 112.

Figure 2:
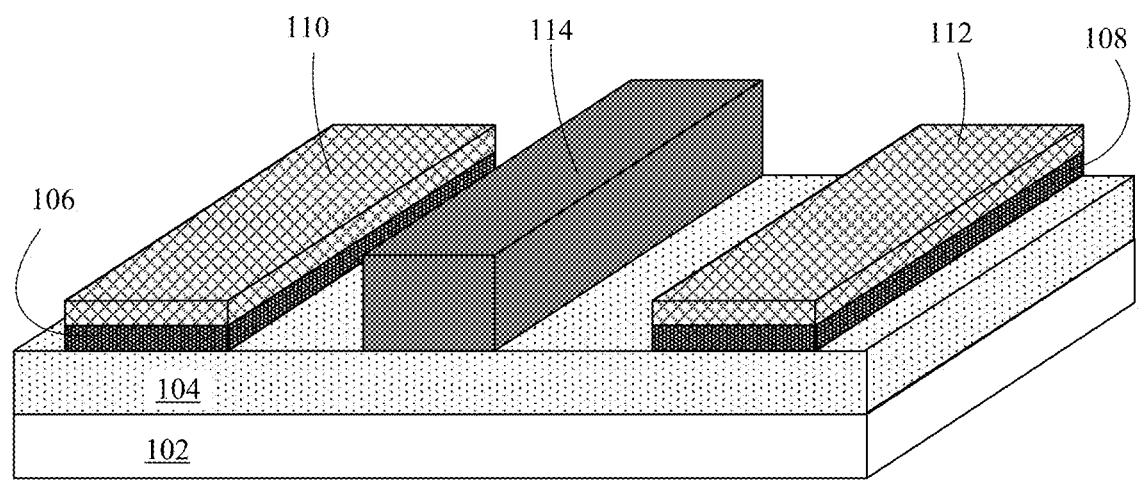
FIG. 2 is a perspective view of the example semiconductor device shown in FIG. 1A and FIG. 1B.
Figure 3:
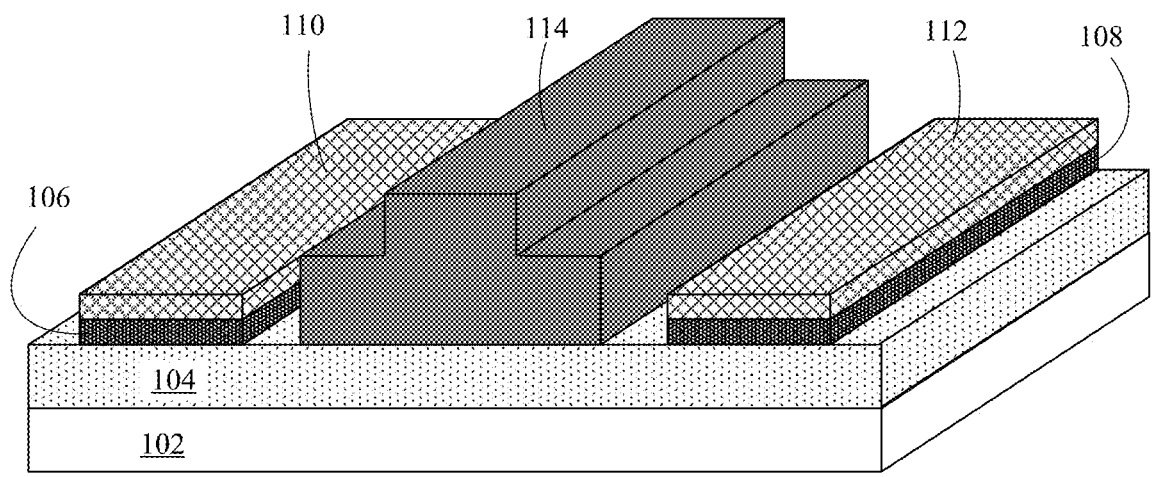
FIG. 3 and FIG. 4 are perspective views of other example modifications of the semiconductor device shown in FIG. 2.
Figure 4:
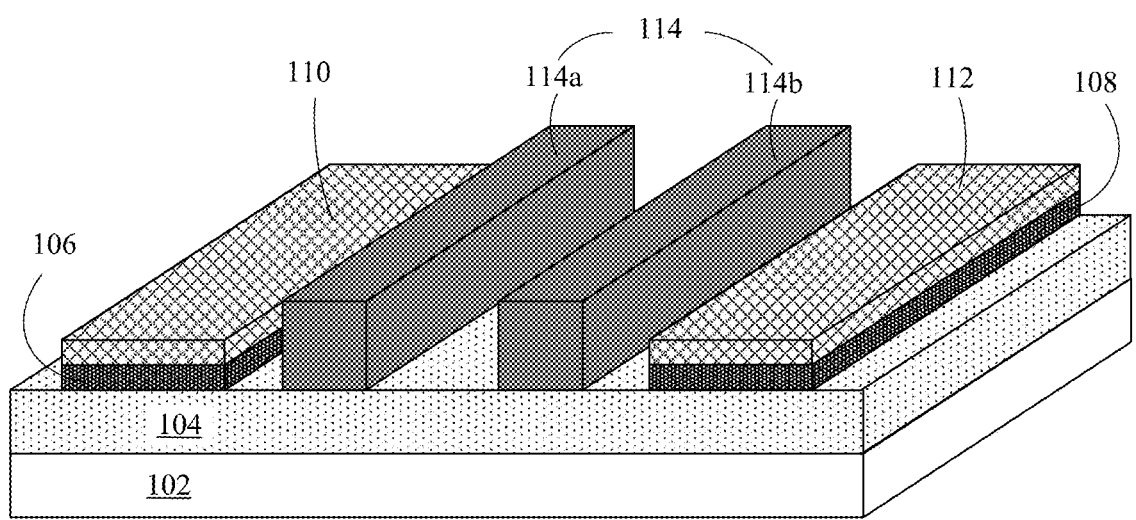

Referring to FIG. 2, FIG. 3, and FIG. 4, in which like reference numerals refer to like features in FIG. 1A and FIG. 1B, perspective views of examples of the semiconductor device are presented. FIG. 2 illustrates the perspective view of the semiconductor device in FIG. 1A and FIG. 1B. As shown in FIG. 2, the optoelectronic component 114 may be a waveguide. The waveguide 114 may be structured as a ridge waveguide. FIG. 3 and FIG. 4 illustrate perspective views of alternative modifications of the waveguide 114. As shown in FIG. 3, the waveguide 114 may be structured as a rib waveguide. As shown in FIG. 4, the waveguide 114 may be structured as a slot waveguide, the slot waveguide 114 having two slabs 114a, 114b.

Figure 5A:
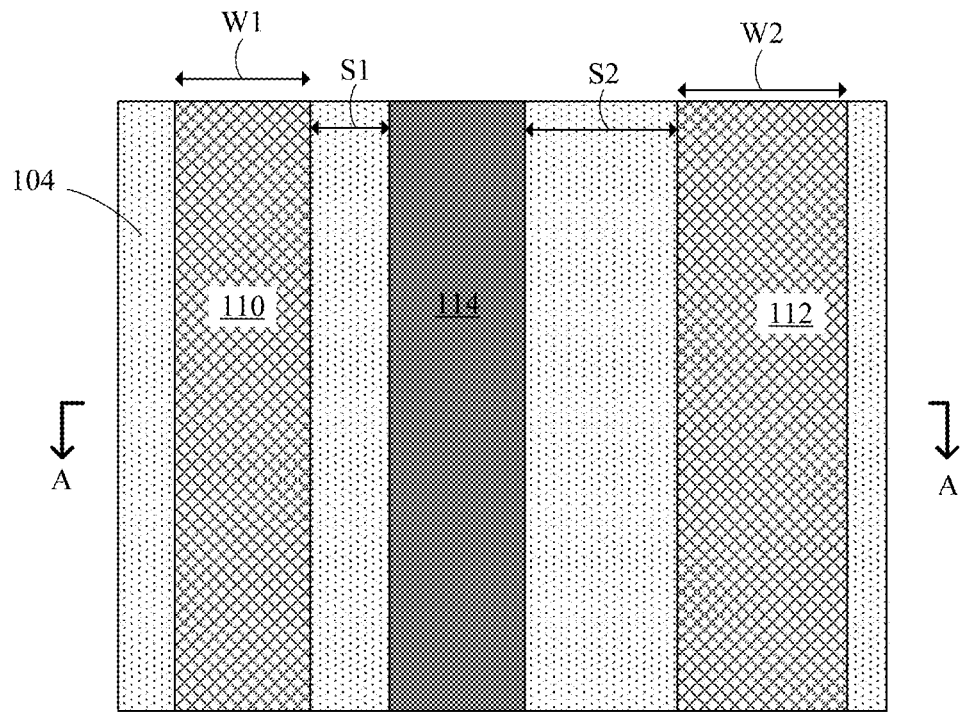
FIG. 5A is a top-down view.
Figure 5B:
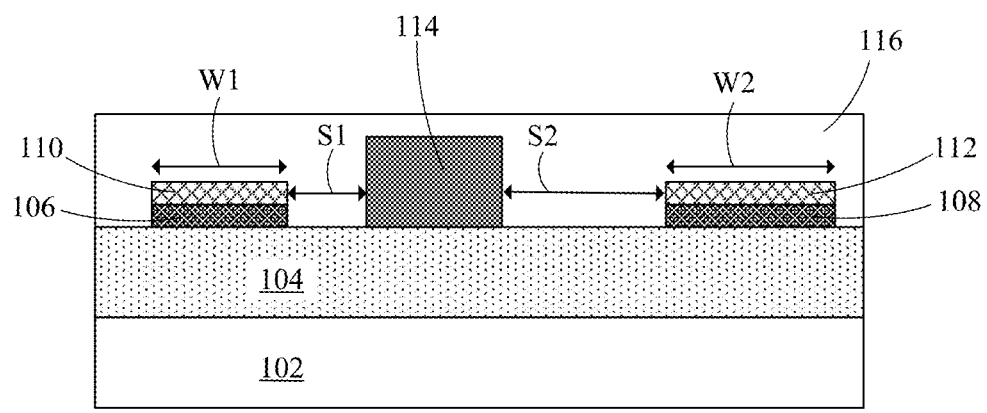
FIG. 5B and FIG. 5C are cross-sectional views depicting another example of a semiconductor device having thermally conductive layers.
Figure 5C:
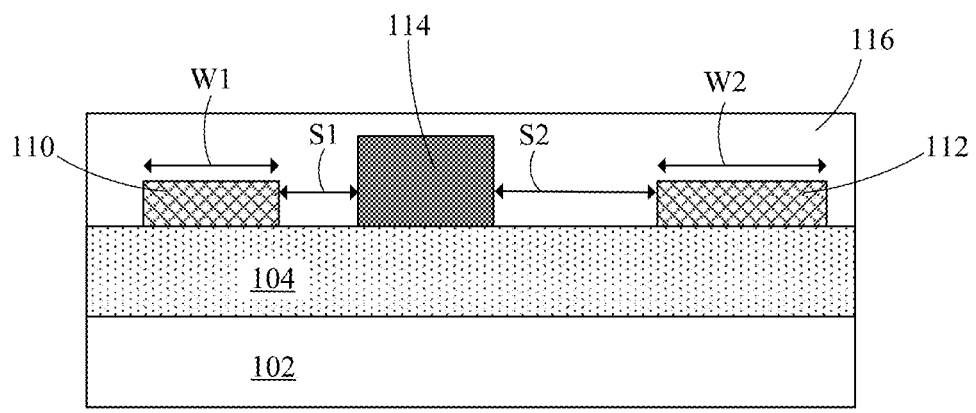

Referring to FIG. 5A, FIG. 5B, and FIG. 5C, another example of a semiconductor device for use in optoelectronic or photonic applications is presented. Like reference numerals in FIG. 5A refer to like features in FIG. 1A, and like reference numerals in FIG. 5B and FIG. 5C refer to like features in FIG. 1B.

With reference to FIG. 5A and FIG. 5B, the semiconductor device may include a first semiconductor layer 106 above a substrate 102, a first thermally conductive layer 110 on the first semiconductor layer 106, a second semiconductor layer 108 above the substrate 102, a second thermally conductive layer 112 on the second semiconductor layer 108, and an opto electronic component 114 above the substrate 102. Alternatively, with reference to FIG. 5A and FIG. 5C, the semiconductor device may include a first thermally conductive layer 110 above the substrate 102, a second thermally conductive layer 112 above the substrate 102, and an optoelectronic component 114 above the substrate 102. In the example shown in FIG. 5C, the thermally conductive layers 110, 112 may be disposed on the buried insulator layer 104, instead of being disposed on the respective semiconductor layers 106, 108 (as shown in FIG. 5B).

With reference to FIG. 5A, FIG. 5B, and FIG. 5C, the optoelectronic component 114 is laterally between the first thermally conductive layer 110 and the second thermally conductive layer 112. The optoelectronic component 114 is also spaced apart from the first thermally conductive layer 110 and the second thermally conductive layer 112. The first thermally conductive layer 110 and the second thermally conductive layer 112 are electrically isolated such that there is no current or voltage passing through the thermally conductive layers 110, 112 and the thermally conductive layers 110, 112 are not electrically connected to a power supply.

As described herein, the optoelectronic component 114 may be spaced apart from the first thermally conductive layer 110 by a first spacing S1. The optoelectronic component 114 may also be spaced apart from the second thermally conductive layer S2 by a second spacing S2. The first thermally conductive layer 110 may have a width W1 and the second thermally conductive layer 112 may have a width W2. In the examples shown in FIG. 5A, FIG. 5B, and FIG. 5C, the first spacing S1 may be different from the second spacing S2. For example, the first spacing S1 may be smaller than the second spacing S2, or the second spacing S2 may be smaller than the first spacing S1. The width W1 of the first thermally conductive layer 110 may be different from the width W2 of the second thermally conductive layer 112. For example, the width W1 may be smaller than the width W2, or the width W2 may be smaller than the width W1. Also shown in FIG. 5A, the first thermally conductive layer 110 and the second thermally conductive layer 112 may be parallel to the optoelectronic component 114.

Figure 6A:
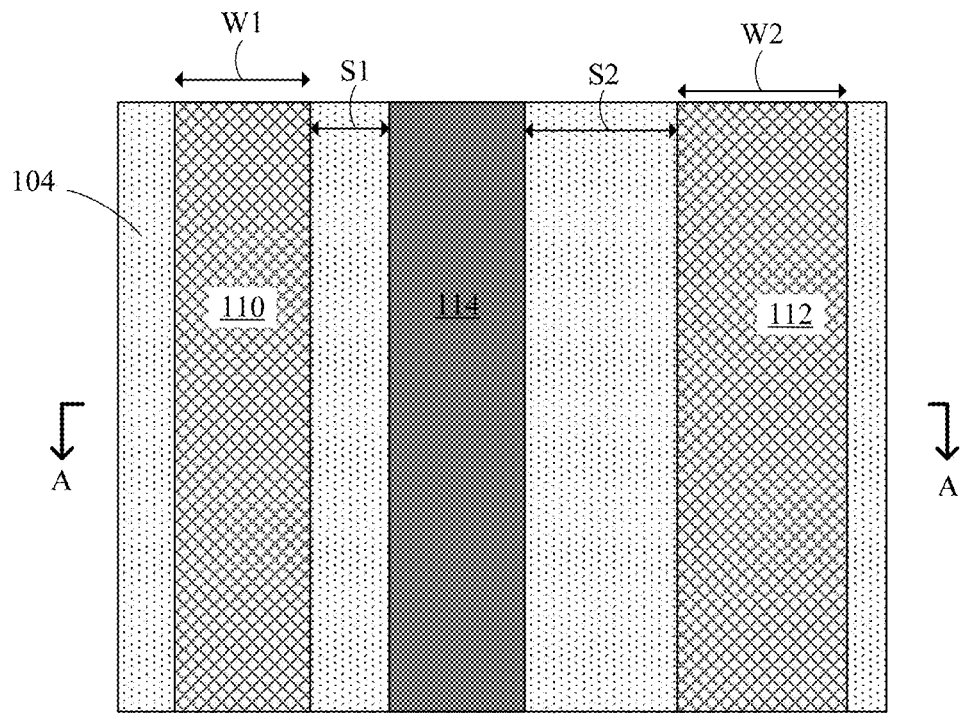
FIG. 6A is a top-down view.
Figure 6B:
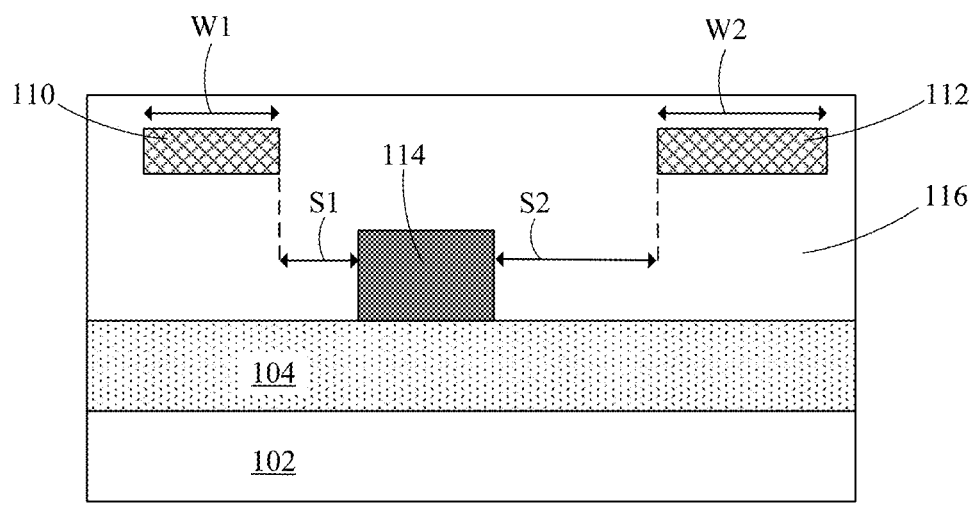
FIG. 6B and FIG. 6C are cross-sectional views depicting yet another example of a semiconductor device having thermally conductive layers.
Figure 6C:
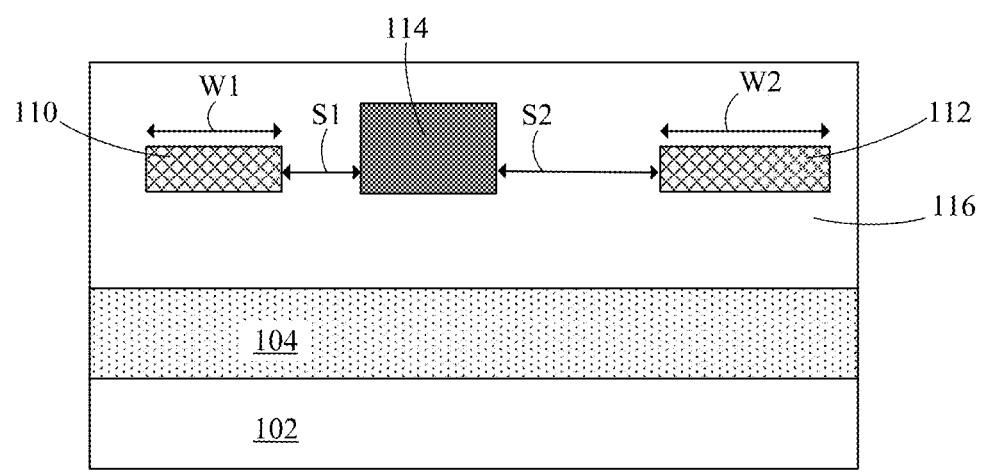

Referring to FIG. 6A, FIG. 6B, and FIG. 6C, yet another example of a semiconductor device for use in optoelectronic or photonic applications is presented. Like reference numerals in FIG. 6A refer to like features in FIG. 1A, and like reference numerals in FIG. 6B and FIG. 6C refer to like features in FIG. 1B. The semiconductor device may include a first thermally conductive layer 110 above a substrate 102, a second thermally conductive layer 112 above the substrate 102, and an optoelectronic component 114 above the substrate 102. The first thermally conductive layer 110 and the second thermally conductive layer 112 are electrically isolated such that there is no current or voltage passing through the thermally conductive layers 110, 112 and the thermally conductive layers 110, 112 are not electrically connected to a power supply.

The optoelectronic component 114 is laterally between the first thermally conductive layer 110 and the second thermally conductive layer 112. The optoelectronic component 114 is also spaced apart from the first thermally conductive layer 110 and the second thermally conductive layer 112. In an example, the optoelectronic component 114 may be laterally displaced from the first thermally conductive layer 110 by a first spacing S1 and may be laterally displaced from the second thermally conductive layer 112 by a second spacing S2. The first spacing S1 may be different from the second spacing S2. For example, the first spacing S1 may be smaller than the second spacing S2, or the second spacing S2 may be smaller than the first spacing S1. Alternatively, the first spacing S1 may be the same as the second spacing S2.

The first thermally conductive layer 110 may have a width W1 and the second thermally conductive layer 112 may have a width W2. The width W1 of the first thermally conductive layer 110 may be different from the width W2 of the second thermally conductive layer 112. For example, the width W1 may be smaller than the width W2, or the width W2 may be smaller than the width W1. Alternatively, the width W1 of the first thermally conductive layer 110 may be the same as the width W2 of the second thermally conductive layer 112. Also shown in FIG. 6A, the first thermally conductive layer 110 and the second thermally conductive layer 112 may be parallel to the optoelectronic component 114. As will be shown in subsequent drawings, the first thermally conductive layer 110 and the second thermally conductive layer 112 may alternatively be non-parallel to the optoelectronic component 114.

In the examples shown in FIG. 6B and FIG. 6C, the first thermally conductive layer 110 and the second thermally conductive layer 112 may be disposed on the dielectric cladding material 116, and may not be disposed on a semiconductor layer. In the example shown in FIG. 6B, the optoelectronic component 114 may be disposed on the buried insulator layer 104. The thermally conductive layers 110, 112 may be positioned above an upper surface of the optoelectronic component 114. Alternatively, in the example shown in FIG. 6C, the optoelectronic component 114 may be disposed above the substrate 102 and the buried insulator layer 104. In another alternative example (not shown), the thermally conductive layers 110, 112 may be positioned above the buried insulator layer 104. The thermally conductive layers 110, 112 may have respective lower surfaces, the lower surfaces of the thermally conductive layers 110, 112 being below the upper surface of the optoelectronic component 114. In yet another example (not shown), a semiconductor layer may be positioned upon the buried insulator layer 104 such that the semiconductor layer may be between the thermally conductive layers 110, 112 and the optoelectronic component 114. The thermally conductive layers 110, 112 and the optoelectronic component 114 may be above the semiconductor layer and the buried insulator layer 104.

Figure 7:
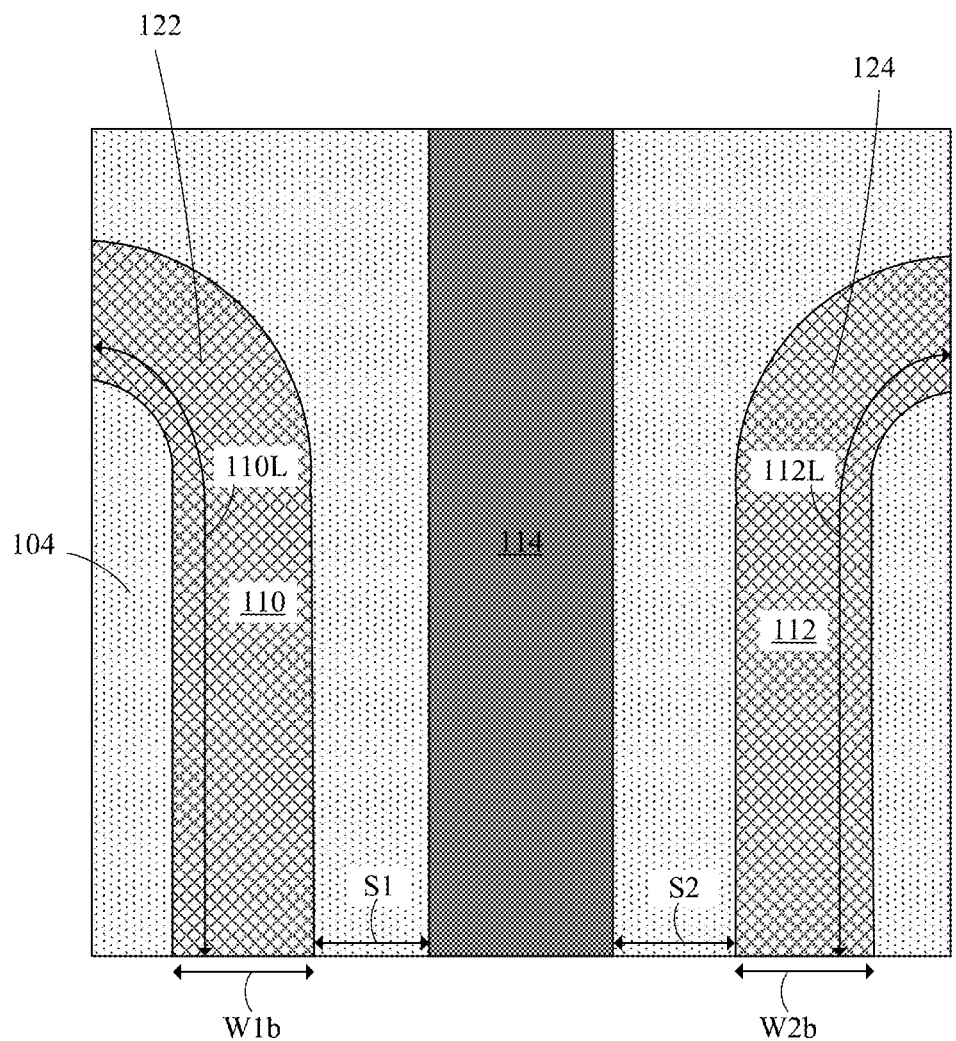
FIG. 7 through FIG. 12 are top-down views depicting other example configurations of the thermally conductive layers and the optoelectronic component described herein.

Referring to FIG. 7, in which like reference numerals refer to like features in FIG. 1A, an alternative example configuration of the thermally conductive layers 110, 112 is presented. The first thermally conductive layer 110 may include a bend 122 and the second thermally conductive layer 112 may include a bend 124. The bend 122 in the first thermally conductive layer 110 may be contiguous with its linear or straight sections. Likewise, the bend 124 in the second thermally conductive layer 112 may be contiguous with its linear or straight sections. The bend 122 in the first thermally conductive layer 110 and the bend 124 in the second thermally conductive layer 112 may form a curved section along their respective longitudinal lengths 110L, 112L. The bends 122, 124 may curve in an arc having a central angle in the range of about 90 degrees to about 179 degrees, about 90 degrees to about 150 degrees, or about 90 degrees to about 120 degrees, although other central angles and arc lengths are contemplated.

Although FIG. 7 illustrates the width W1 of the first thermally conductive layer 110 and the width W2 of the second thermally conductive layers 112 as being constant along their respective longitudinal lengths 110L, 112L, it should be noted that the present disclosure also contemplates modifications where the width W1 of the first thermally conductive layer 110 may vary along the longitudinal length 110L of the first thermally conductive layer 110, and the width W2 of the second thermally conductive layer 112 may vary along the longitudinal length 112L of the second thermally conductive layer 112.

In some implementations (not shown), the first thermally conductive layer 110 and the second thermally conductive layer 112 may have respective bends that are tapered to provide a combination of tapering and curvature. For example, the first thermally conductive layer 110 may be tapered such that the width of the bend 122 in the first thermally conductive layer 110 decreases or increases along at least a portion of its longitudinal length, and the second thermally conductive layer 112 may be tapered such that the width of the bend 124 in the second thermally conductive layer 112 decreases or increases along at least a portion of its longitudinal length.

The first thermally conductive layer 110 and the second thermally conductive layer 112 may either diverge away from or converge towards the optoelectronic component 114. In the example shown in FIG. 7, the first thermally conductive layer 110 and the second thermally conductive layer 112 may include straight sections that are parallel to the optoelectronic component 114 and bends 122, 124 that diverges away from the optoelectronic component 114.

In the example shown in FIG. 7, the width W1 of the first thermally conductive layer 110 may be either the same, or different from, the width W2 of the second thermally conductive layer 112. Additionally, the spacing S1 between the first thermally conductive layer 110 and the optoelectronic component 114 may either be the same as, or different from, the spacing S2 between the second thermally conductive layer 112 and the optoelectronic component 114.

Figure 8:
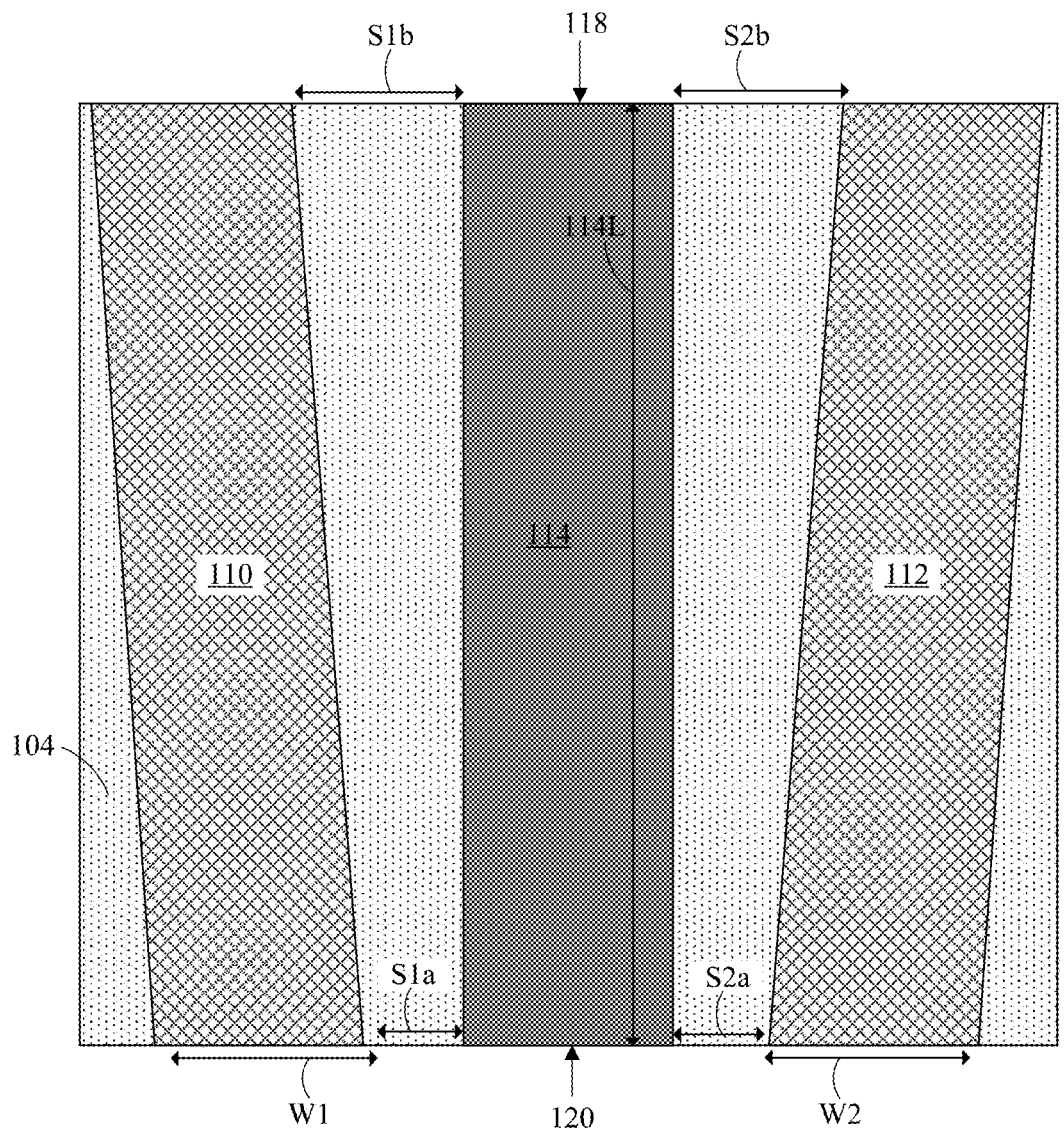

Referring to FIG. 8, in which like reference numerals refer to like features in FIG. 1A, another alternative example configuration of the thermally conductive layers 110, 112 is presented. As described above, the spacing S1 between the optoelectronic component 114 and the first thermally conductive layer 110 and the spacing S2 between the optoelectronic component 114 and the second thermally conductive layer 112 may vary along the longitudinal length 114L of the optoelectronic component 114.

In some embodiments, the optoelectronic component 114 illustrated in FIG. 8 may be a waveguide. The waveguide 114 may have an input end 120 that receives optical signals and an output end 118 that sends optical signals. An optical signal, such as light or laser light, may enter the waveguide 114 at the input end 120, transmit along the waveguide 114, and then exit the waveguide 114 at the output end 118. The waveguide 114 may be spaced apart from the first thermally conductive layer 110 by a first spacing S1, and the waveguide 114 may be spaced apart from the second thermally conductive layer 112 by a second spacing S2. The first spacing S1 and the second spacing S2 may vary as a function of position relative to the input end 120 of the waveguide 114. For example, the first spacing S1 and the second spacing S2 may be varied based on a linear function or a non-linear function to provide the variation with position relative to the input end 120 of the waveguide 114. Exemplary non-linear functions include, but are not limited to, parabolic function, exponential function, quadratic function, logarithmic function, and polynomial functions with a degree of at least 2.

The input end 120 of a waveguide 114 may have a higher temperature relative to the output end 118 of the waveguide 114. To increase the rate of heat dissipation from the waveguide 114 at the hotter input end 120 of the waveguide 114, the first spacing S1 and the second spacing S2 may increase linearly, along the longitudinal length 114L of the waveguide 114, with increasing distance from the input end 120 of the waveguide 114 such that the smaller value of the first spacing S1a and the smaller value of the second spacing S2a occur proximal to the input end 120 of the waveguide 114 and the larger value of the first spacing S1a and the larger value of the second spacing S2a occur distal to the input end 120 of the waveguide 114.

In the example shown in FIG. 8, the width W1 of the first thermally conductive layer 110 may be either the same, or different from, the width W2 of the second thermally conductive layer 112. Additionally, the spacing S1 between the first thermally conductive layer 110 and the optoelectronic component 114 may either be the same as, or different from, the spacing S2 between the second thermally conductive layer 112 and the optoelectronic component 114.

Figure 9:
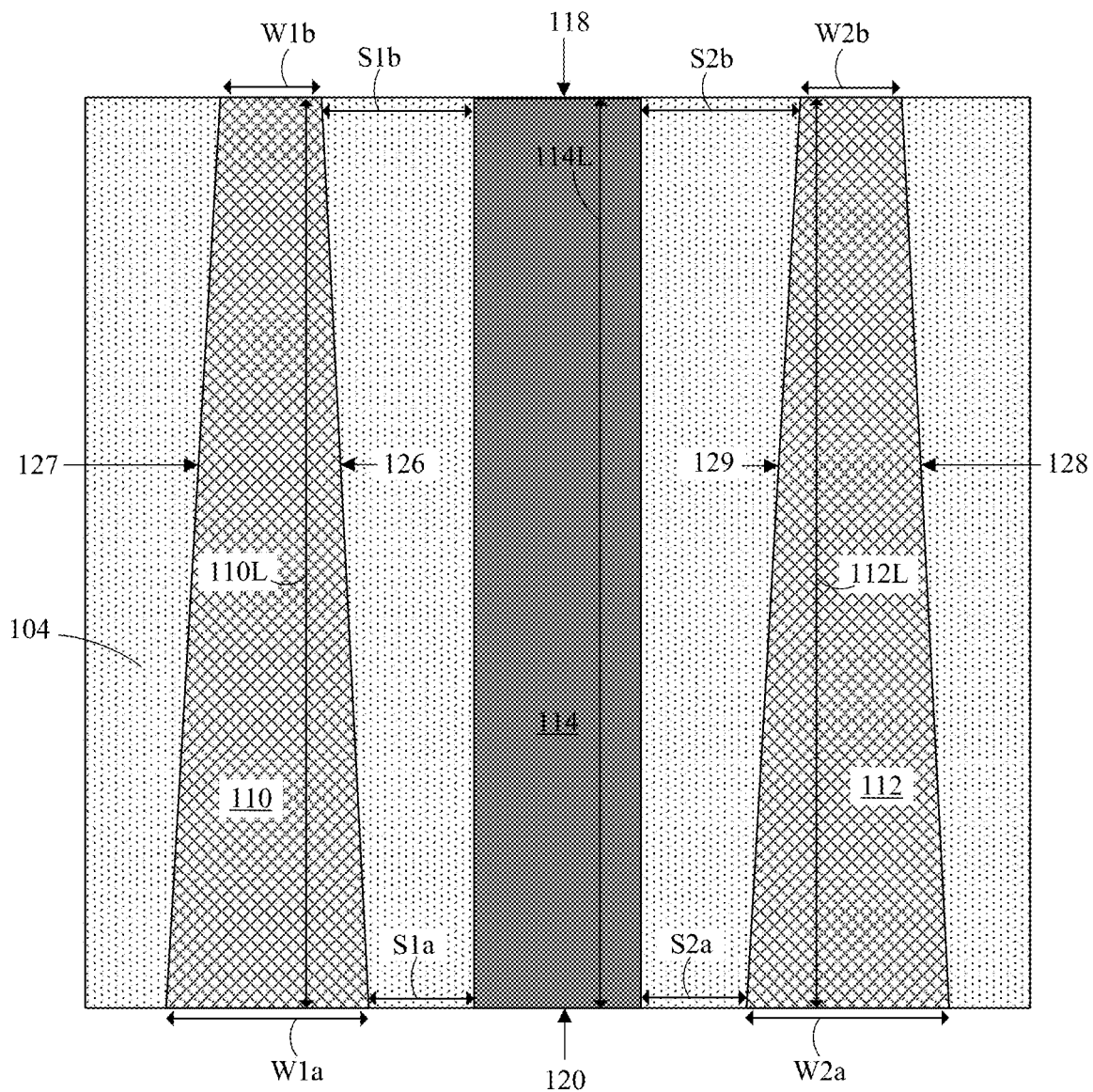
Figure 10:
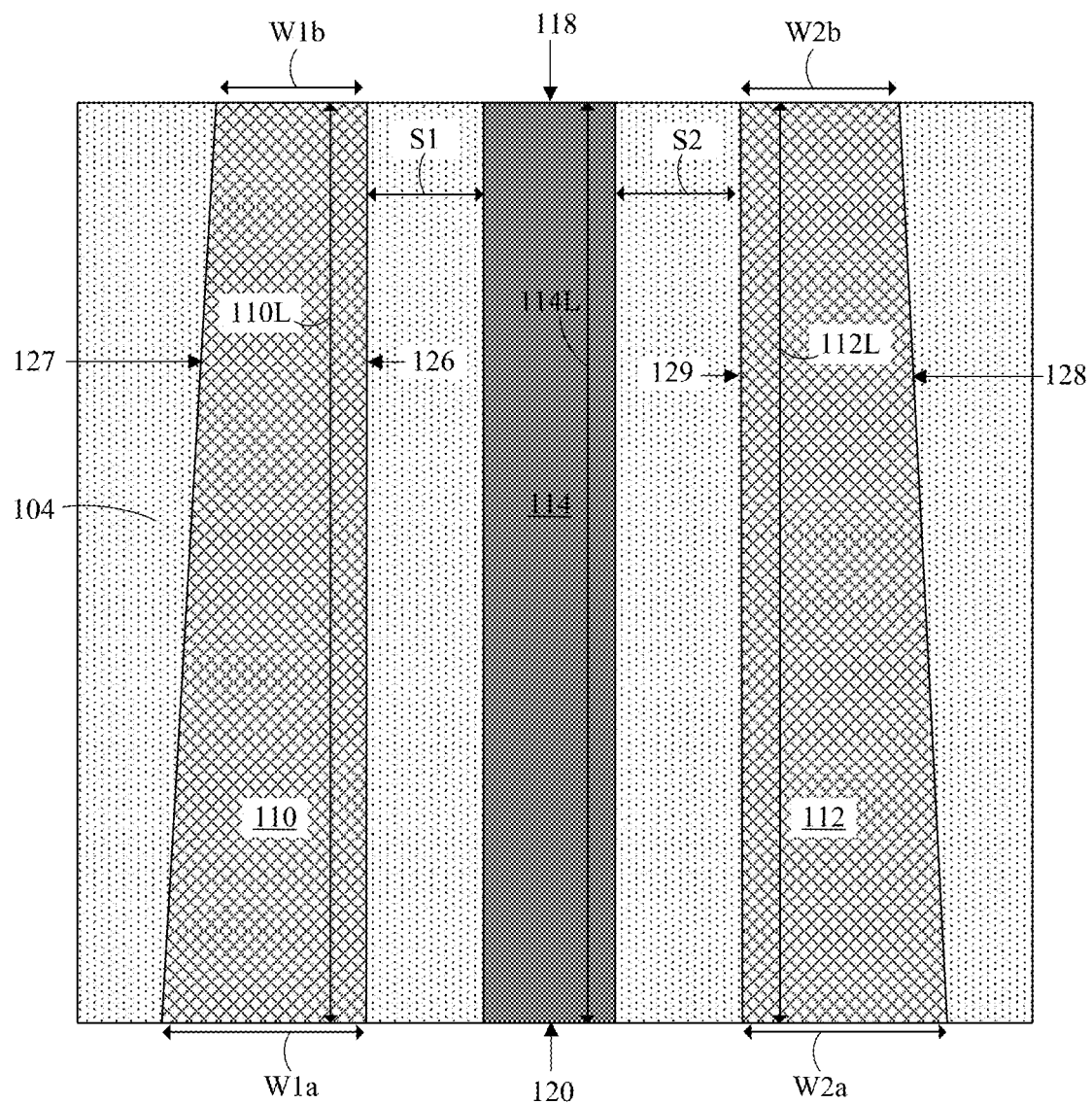

Referring to FIG. 9 and FIG. 10, in which like reference numerals refer to like features in FIG. 1A, alternative example configurations of the thermally conductive layers 110, 112 are presented. As described above, the width W1 of the first thermally conductive layer 110 may vary along the longitudinal length 110L of the first thermally conductive layer 110, and the width W2 of the second thermally conductive layer 112 may vary along the longitudinal length 112L of the second thermally conductive layer 112. The width W1 of the first thermally conductive layer 110 may be either the same, or different from, the width W2 of the second thermally conductive layer 112. Additionally, in the examples shown in FIG. 9 and FIG. 10, the spacing S1 between the first thermally conductive layer 110 and the optoelectronic component 114 may either be the same as, or different from, the spacing S2 between the second thermally conductive layer 112 and the optoelectronic component 114.

In some embodiments, the optoelectronic component 114 illustrated in FIG. 9 and FIG. 10 may be a waveguide. The waveguide 114 may have an input end 120 that receives optical signals and an output end 118 that sends optical signals. An optical signal, such as light, may enter the waveguide 114 at the input end 120, transmit along the waveguide 114, and then exit the waveguide 114 at the output end 118. The first thermally conductive layer 110 and the second thermally conductive layer 112 may have widths W1, W2 that vary as a function of position relative to the input end 120 of the waveguide 114. For example, the width W1 of the first thermally conductive layer 110 and the width W2 of the second thermally conductive layer 112 may be varied based on a linear function or a non-linear function to provide the variation with position relative to the input end 120 of the waveguide 114. Exemplary non-linear functions include, but are not limited to, parabolic function, exponential function, quadratic function, logarithmic function, and polynomial functions with a degree of at least 2.

The input end 120 of a waveguide 114 may have a higher temperature relative to the output end 118 of the waveguide 114. To increase the rate of heat dissipation from the waveguide 114 at the hotter input end 120 of the waveguide 114, the width W1 of the first thermally conductive layer 110 and the width W2 of the second thermally conductive layer 112 may decrease linearly, along their respective longitudinal lengths 110L, 112L, with increasing distance from the input end 120 of the waveguide 114 such that the first thermally conductive layer 110 and the second thermally conductive layer 112 have larger widths W1a, W2a at positions proximal to the input end 120 of the waveguide 114 and smaller widths W1b, W2b at positions distal to the input end 120 of the waveguide 114.

The first thermally conductive layer 110 and the second thermally conductive layer 112 may have tapered structures. In the example shown in FIG. 9, the first thermally conductive layer 110 may have sides 127, 126 that taper towards each other as they extend away from the input end 120 of the waveguide 114. Likewise, the second thermally conductive layer 112 may have sides 128, 129 that taper towards each other as they extend away from the input end 120 of the waveguide 114. The first spacing S1 between the first thermally conductive layer 110 and the waveguide 114 and the second spacing S2 between the second thermally conductive layer 112 and the waveguide 114 may vary as a function of position relative to the input end 120 of the waveguide 114. For example, the first spacing S1 and the second spacing S2 may increase linearly, along the longitudinal length 114L of the waveguide 114, with increasing distance from the input end 120 of the waveguide 114 such that the smaller value of the first spacing S1a and the smaller value of the second spacing S2a occur proximal to the input end 120 of the waveguide 114 and the larger value of the first spacing S1a and the larger value of the second spacing S2a occur distal to the input end 120 of the waveguide 114.

Alternatively, in the example shown in FIG. 10, the first thermally conductive layer 110 may have sides 127, 126. Side 126 may be parallel to the waveguide 114. Side 127 may taper towards side 126 as they extend away from the input end 120 of the waveguide 114. Likewise, the second thermally conductive layer 112 may have sides 128, 129. Side 129 may be parallel to the waveguide 114. Side 128 may taper towards each other as they extend away from the input end 120 of the waveguide 114. The spacing S1 between the waveguide 114 and the first thermally conductive layer 110 and the spacing S2 between the waveguide 114 and the second thermally conductive layer 112 may remain constant along the longitudinal length 114L of the waveguide 114.

It should be noted that the tapered structures of the thermally conductive layers 110, 112, as described in FIG. 9 and FIG. 10, are also contemplated as applying to all other examples described in the present disclosure, including but not limited to, the examples illustrated in FIG. 1A through FIG. 8, FIG. 11 through FIG. 15.

Figure 11:
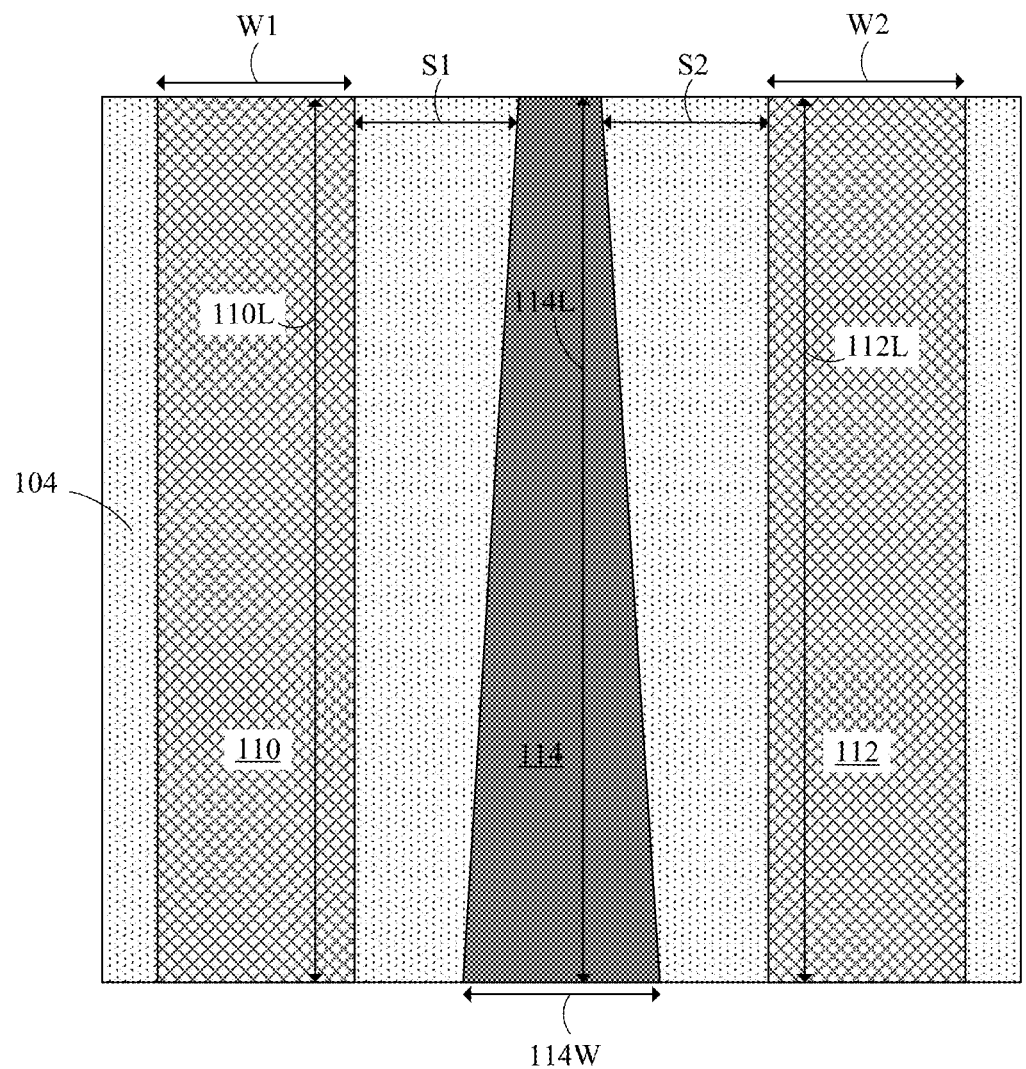

Referring to FIG. 11, in which like reference numerals refer to like features in FIG. 1A, in embodiments where the optoelectronic component 114 is a waveguide, the waveguide may have a tapered structure. As shown, the waveguide 114 may have a width 114W that varies along the longitudinal length 114L of the waveguide 114. Accordingly, the spacing S1 between the first thermally conductive layer 110 and the waveguide 114 and the spacing S2 between the second thermally conductive layer 112 and the waveguide 114 may vary along the longitudinal length 114L of the waveguide 114.

Although FIG. 11 illustrates the thermally conductive layers 110, 112 as having constant widths W1, W2, it should be noted that the thermally conductive layers 110, 112 in FIG. 11 may be modified to have widths W1, W2 that vary along their respective longitudinal lengths 110L, 112L. Additionally, the example shown in FIG. 11 may alternatively be modified such that the first thermally conductive layer 110 and the second thermally conductive layer 112 have either the same or different widths W1, W2, respectively. The spacing S1 between the first thermally conductive layer 110 and the waveguide 114 may either be the same as, or different from, the spacing S2 between the second thermally conductive layer 112 and the waveguide 114.

Figure 12:
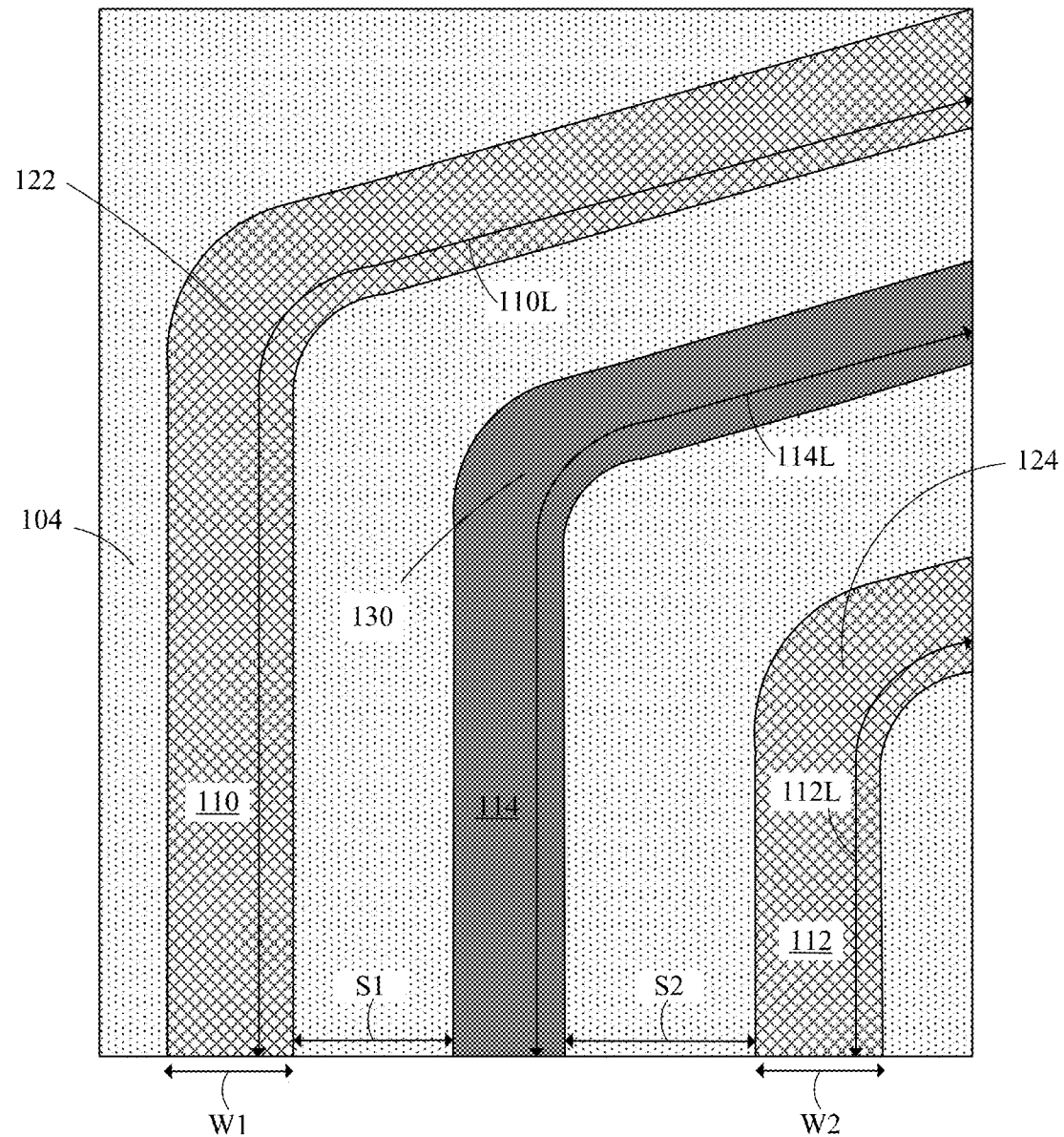
Figure 13B:
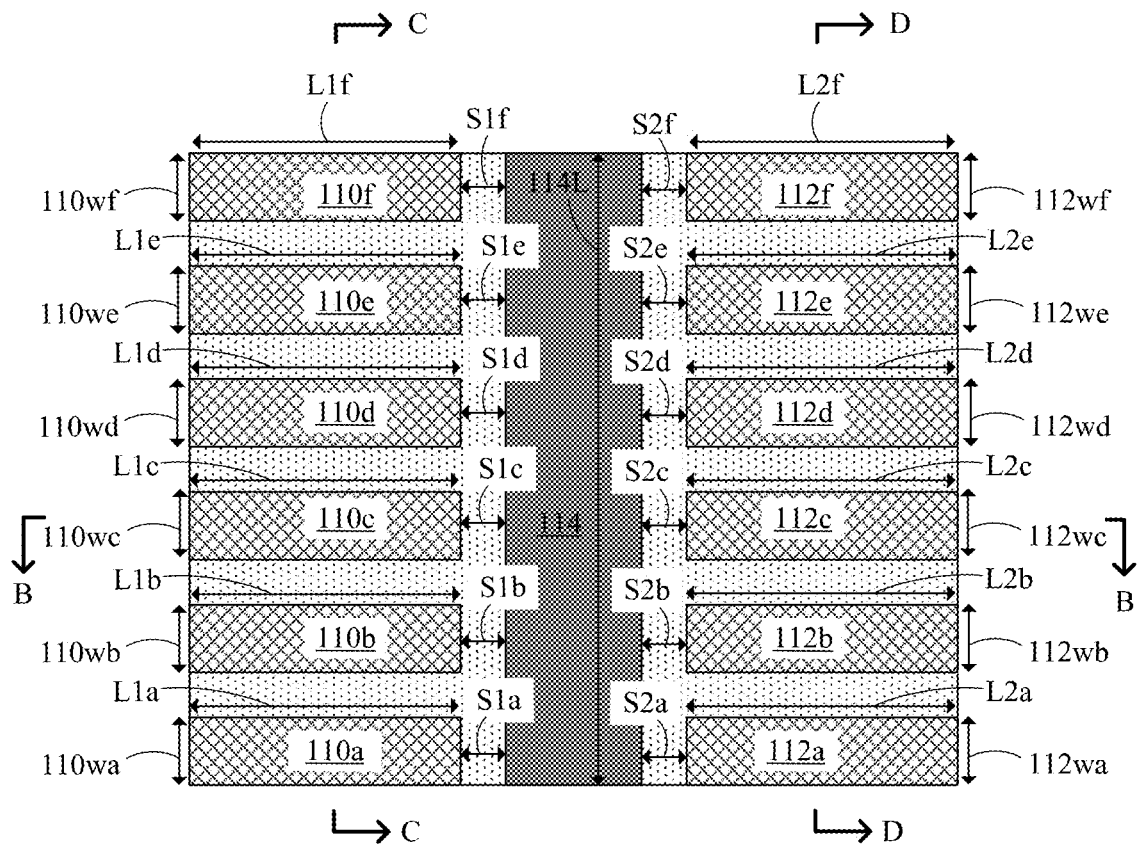
FIG. 13B through FIG. 13D are cross-sectional views depicting yet another example of a semiconductor device having thermally conductive layers.
Figure 13B:
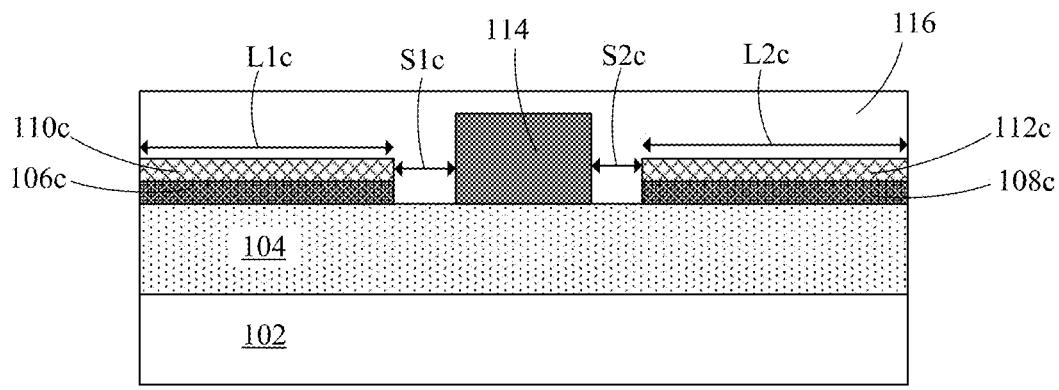
Figure 13C:
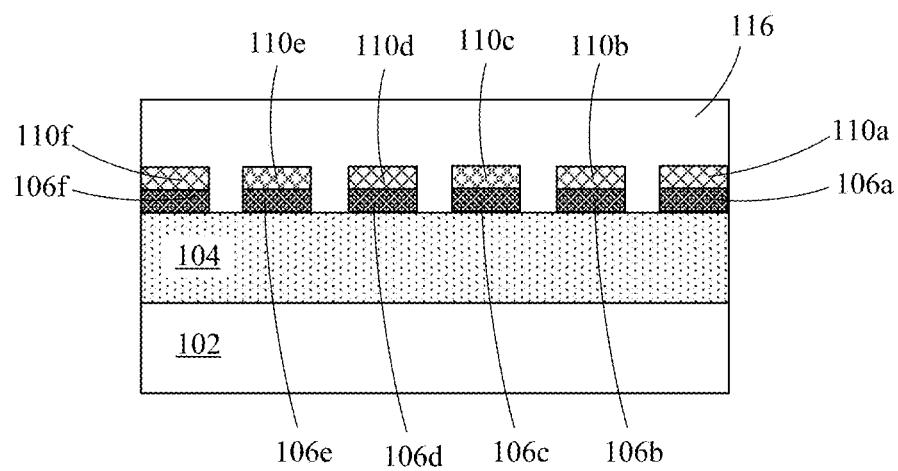
Figure 13D:
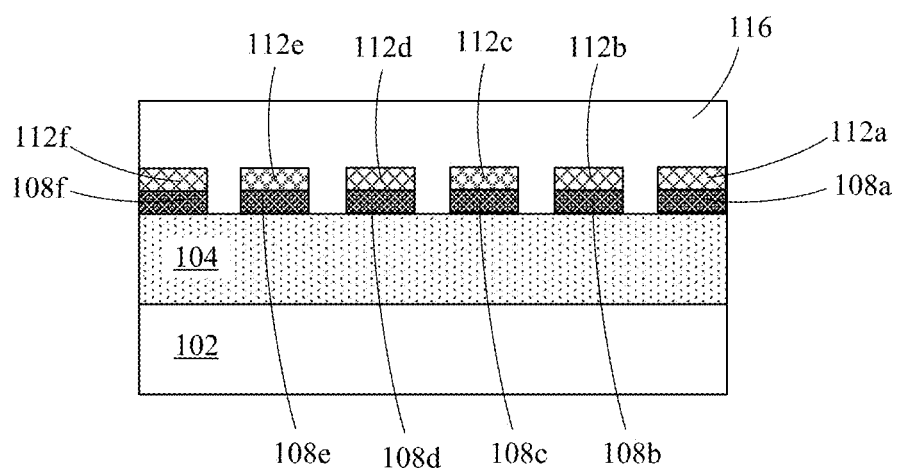

Referring to FIG. 12, in which like reference numerals refer to like features in FIG. 1A, in embodiments where the optoelectronic component 114 is a waveguide, the waveguide may have a bend 130 that is contiguous with its linear or straight sections. The bend 130 in the waveguide 114 may form a curved section along its longitudinal length 114L. The bend 130 may curve in an arc having a central angle in the range of about 90 degrees to about 179 degrees, about 90 degrees to about 150 degrees, or about 90 degrees to about 120 degrees, although other central angles and arc lengths are contemplated. The first thermally conductive layer 110 may include a bend 122 and the second thermally conductive layer 112 may include a bend 124.

In some implementations (not shown), the waveguide 114, the first thermally conductive layer 110, and the second thermally conductive layer 112 may have respective bends that are tapered to provide a combination of tapering and curvature. For example, the waveguide 114 may be tapered such that the width of the bend 130 in the waveguide 114 decreases or increases along at least a portion of its longitudinal length. Likewise, the first thermally conductive layer 110 may be tapered such that the width of the bend 122 in the first thermally conductive layer 110 decreases or increases along at least a portion of its longitudinal length, and the second thermally conductive layer 112 may be tapered such that the width of the bend 124 in the second thermally conductive layer 112 decreases or increases along at least a portion of its longitudinal length.

The bend 122 in the first thermally conductive layer 110 and the bend 124 in the second thermally conductive layer 112 may correspond to the bend 130 in the waveguide 114. For example, the bend 122 in the first thermally conductive layer 110 and the bend 124 in the second thermally conductive layer 112 may have a curvature that corresponds to the curvature of the bend 130 in the waveguide 114. In some embodiments, the bend 122 in the first thermally conductive layer 110 and the bend 124 in the second thermally conductive layer 112 may curve in respective arcs having central angles substantially identical to the central angle in the bend 130 of the waveguide 114. As shown, the first thermally conductive layer 110 and the second thermally conductive layer 112 may be parallel to the waveguide 114.

The example shown in FIG. 12 may alternatively be modified such that the first thermally conductive layer 110 and the second thermally conductive layer 112 have either the same or different widths W1, W2, respectively. The spacing S1 between the first thermally conductive layer 110 and the waveguide 114 may either be the same as, or different from, the spacing S2 between the second thermally conductive layer 112 and the waveguide 114.

Referring to FIG. 13A through FIG. 13D, in which like reference numerals refer to like features in FIG. 1A and FIG. 1B, another example of a semiconductor device for use in optoelectronic or photonic applications is presented. First referring to FIG. 13A and FIG. 13B, the semiconductor device may include an optoelectronic component 114 above the substrate 102. The optoelectronic component 114 is laterally between and spaced apart from a first plurality of thermally conductive layers 110a-110f and a second plurality of thermally conductive layers 112a-112f. Next referring to FIG. 13C, the semiconductor device may further include a first plurality of semiconductor layers 106a-106f above a substrate 102. Each thermally conductive layer 110a-110f in the first plurality of thermally conductive layers 110a-110f is on each semiconductor layer 106a-106f in the first plurality of semiconductor layers 106a-106f. Next referring to FIG. 13D, the semiconductor device may further include a second plurality of semiconductor layers 108a-108f above the substrate 102. Each thermally conductive layer 112a-112f in the second plurality of thermally conductive layers 112a-112f is on each semiconductor layer 108a-108f in the second plurality of semiconductor layers 108a-108f. In the examples shown in FIG. 13A through FIG. 13D, the first plurality of thermally conductive layers 110a-110f and the second plurality of thermally conductive layers 112a-112f are electrically isolated such that there is no current or voltage passing through the pluralities of thermally conductive layers 110a-110f, 112a-112f and the pluralities of thermally conductive layers 110a-110f, 112a-112f are not electrically connected to a power supply.

Referring again to FIG. 13A and FIG. 13B, as described above, the optoelectronic component 114 is laterally between the first plurality of thermally conductive layers 110a-110f and the second plurality of thermally conductive layers 112a-112f. The optoelectronic component 114 is also spaced apart from the first plurality of thermally conductive layers 110a-110f and the second plurality of thermally conductive layers 112a-112f. For example, the first plurality of thermally conductive layers 110a-110f may be spaced apart from the optoelectronic component 114 by a first set of spacings S1a-S1a, respectively, and the second plurality of thermally conductive layers 112a-112f may be spaced apart from the optoelectronic component 114 by a second set of spacings S2a-S2f, respectively.

The first set of spacings S1a-S1a may have the same distance such that each thermally conductive layer 110a-110f in the first plurality of thermally conductive layers 110a-110f may be uniformly spaced apart from the optoelectronic component 114. Likewise, the second set of spacings S2a-S2f may have the same distance such that each thermally conductive layer 112a-112f in the second plurality of thermally conductive layers 112a-112f may be uniformly spaced apart from the optoelectronic component 114. The first set of spacings S1a-S1a between the first plurality of thermally conductive layers 110a-110f and the optoelectronic component 114 may either be the same as, or different from, the second set of spacings S2a-S2f between the second plurality of thermally conductive layers 112a-112f and the optoelectronic component 114.

The first plurality of thermally conductive layers 110a-110f may have uniform widths 110wa-110wf, respectively, and the second plurality of thermally conductive layers 112a-112f may have uniform widths 112wa-112wf, respectively. The widths 110wa-110wf of the first plurality of thermally conductive layers 110a-110f may either be the same as, or different from, from the widths 112wa-112wf of the second plurality of thermally conductive layers 112a-112f.

The thermally conductive layers 110a-110f, 112a-112f in the respective first and second pluralities are perpendicular to the optoelectronic component 114. The first plurality of thermally conductive layers 110a-110f and the second plurality of thermally conductive layers 112a-112f may be elongated and have longitudinal lengths. For example, the first plurality of thermally conductive layers may have respective longitudinal lengths L1a-L1f and the second plurality of thermally conductive layers 112a-112f may have respective longitudinal lengths L2a-L2f.

In some embodiments, the optoelectronic component 114 may be a waveguide. The waveguide 114 may be elongated and may have a longitudinal length 114L. The longitudinal lengths L1a-L1f, L2a-L2f of the thermally conductive layers 110a-110f, 112a-112f in the first and second pluralities may be perpendicular to the longitudinal length 114L of the waveguide 114.

Figure 14:
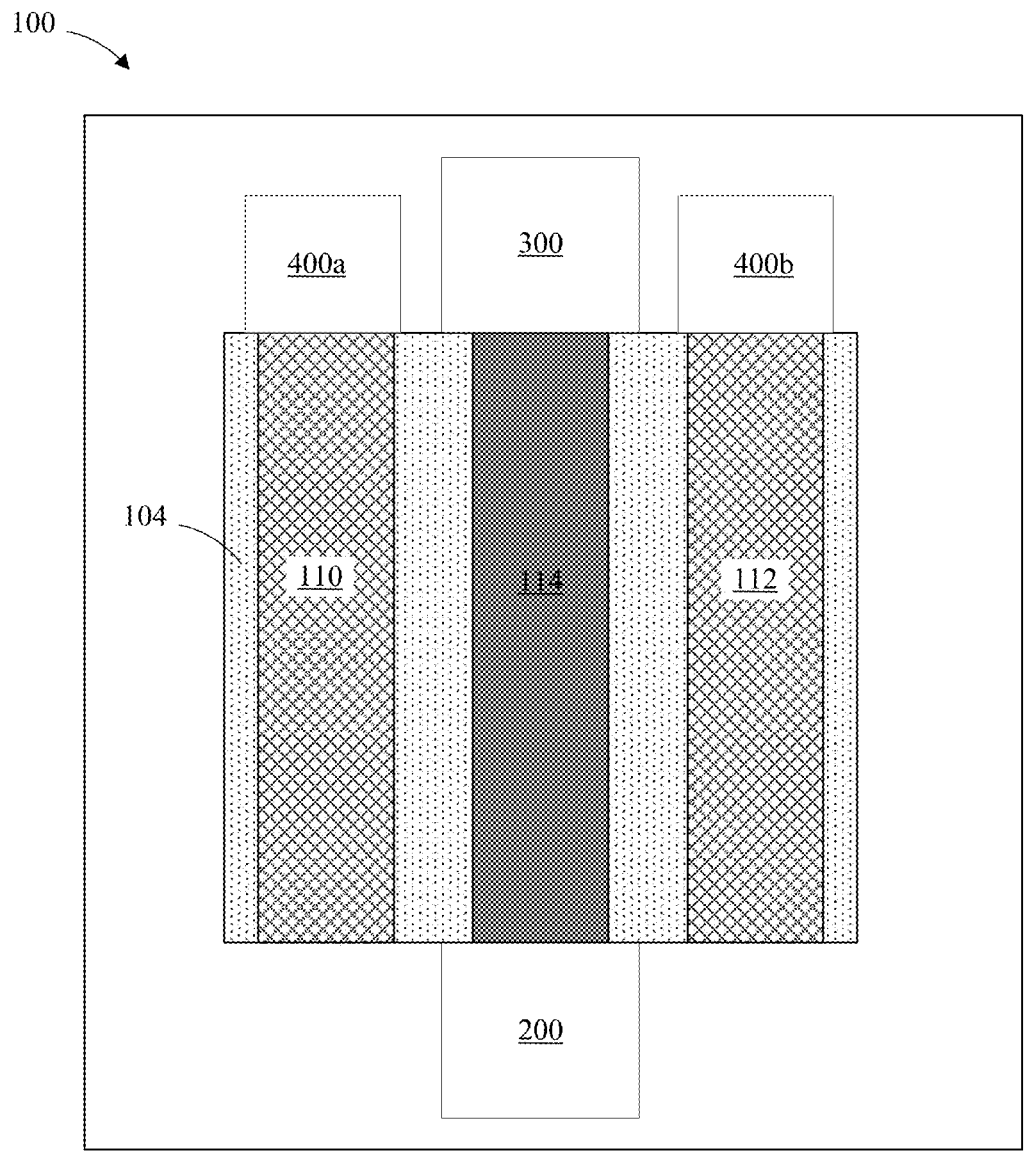
FIG. 14 is a top-down view of an example photonics chip including the semiconductor device shown in FIG. 1A.

Referring to FIG. 14, an example of a photonics chip 100 including the semiconductor device shown in FIG. 1A is presented. As an illustrative example, the photonics chip 100 may include a waveguide 114. The waveguide 114 may be optically coupled to optical components, such as an optical fiber 200 and a laser device 300. The waveguide 114 may be laterally between the thermally conductive layer 110 and the second thermally conductive layer 112. The first thermally conductive layer 110 and the second thermally conductive layer 112 may be thermally coupled to heat sinks 400a, 400b. Heat energy may be generated within the waveguide 114 due to the transmission of optical signals (e.g., laser light) between the optical fiber 200 and the laser device 300. The thermally conductive layers 110, 112 may conduct and dissipate the heat energy within the waveguide 114. In an implementation, the thermally conductive layers 110, 112 may reduce the maximum temperature of the waveguide 114 by about 300 Kelvins if the laser device 300 provides an input power of 150 mW to the waveguide 114. In another implementation, the thermally conductive layers 110, 112 may reduce the maximum temperature of the waveguide 114 by about 400 Kelvins if the laser device 300 provides an input power of 200 mW to the waveguide 114. The heat sinks 400a, 400b may be configured to absorb the heat energy conducted by the thermally conductive layers 110, 112, and subsequently, dissipated out of the photonics chip 100. The heat sinks 400a, 400b may be integrated within the photonics chip 100. For example, the heat sinks 400a, 400b may be formed in a substrate, or formed above the back end of line structures of the photonics chip. Example structures for the heat sinks 400a, 400b may include, but are not limited to, cooling fins or copper plates.

Figure 15:
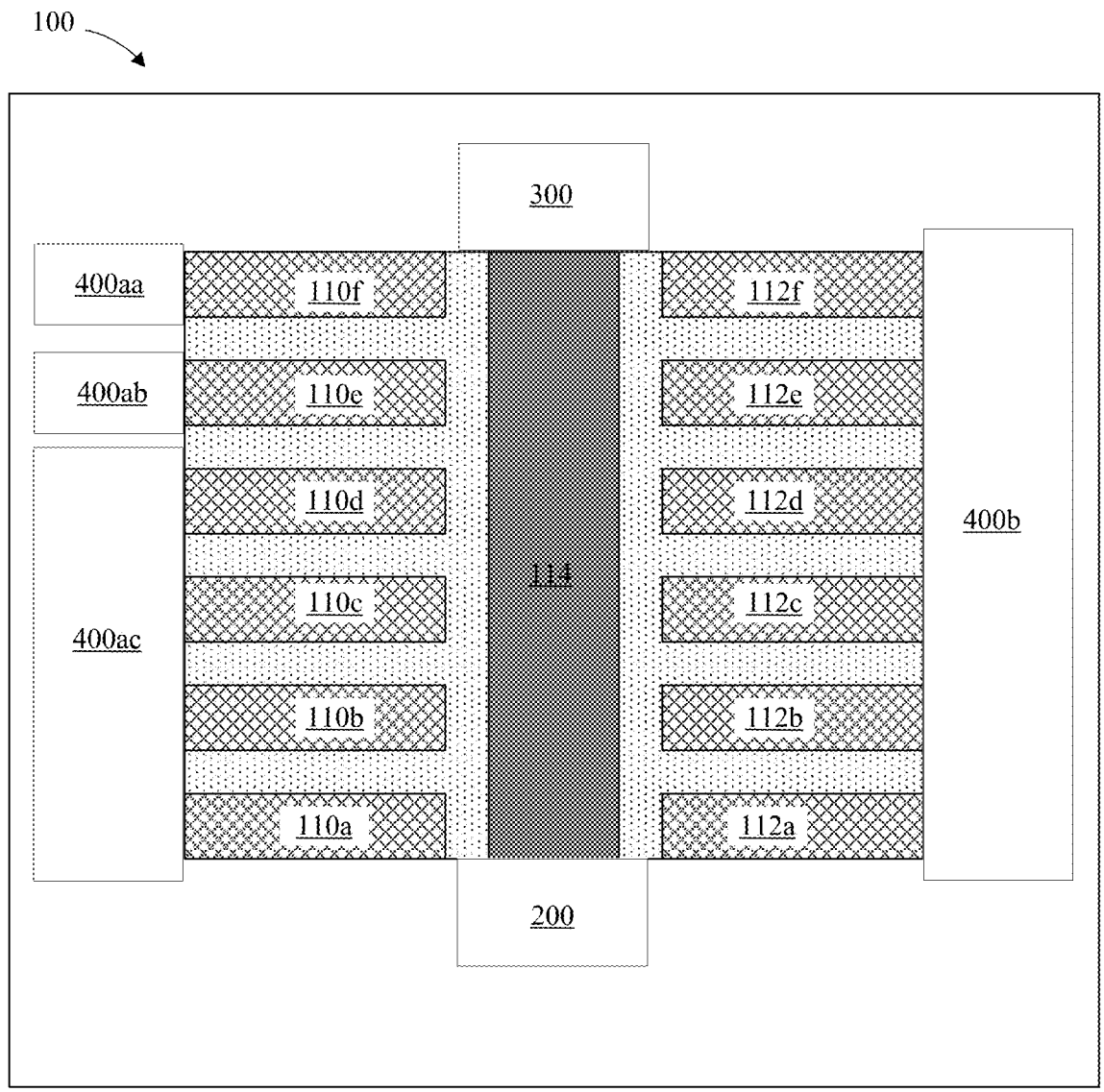
FIG. 15 is a top-down view of another example photonics chip including the semiconductor device shown in FIG. 13A.

Referring to FIG. 15, another example of a photonics chip 100 including the semiconductor device shown in FIG. 13A is presented. As an illustrative example, the photonics chip 100 may include a waveguide 114. The waveguide 114 may be optically coupled to optical components, such as an optical fiber 200 and a laser device 300. The waveguide 114 may be laterally between the first plurality of thermally conductive layers 110a-110f and the second plurality of thermally conductive layers 112a-112f. The first plurality of thermally conductive layer 110a-110f and the second plurality of thermally conductive layers 112a-112f may be thermally coupled to heat sinks. The thermally conductive layers may be individually thermally coupled to a heat sink, or alternatively, the thermally conductive layers may be collectively thermally coupled to a heat sink. For example, the thermally conductive layers 110e, 110f in the first plurality may be individually thermally coupled heat sinks 400ab, 400aa, respectively, while the thermally conductive layers 110a, 110b, 110c, 110d the first plurality may be collectively thermally coupled to a heat sink 400ac. The thermally conductive layers 112a-112f in the second plurality may be collectively thermally coupled to a heat sink 400b.

Heat energy may be generated within the waveguide 114 due to the transmission of optical signals (e.g., laser light) between the optical fiber 200 and the laser device 300. The pluralities of thermally conductive layers 110a-110f, 112a-112f may conduct and dissipate the heat energy within the waveguide 114. The heat sinks 400aa, 400ab, 400ac, 400b may be configured to absorb the heat energy conducted by the thermally conductive layers 110a-110f, 112a-112f, and subsequently, dissipated out of the photonics chip 100. The heat sinks 400aa, 400ab, 400ac, 400b may be integrated within the photonics chip 100. For example, the heat sinks 400aa, 400ab, 400ac, 400b may be formed in a substrate, or formed above the back end of line structures of the photonics chip. Example structures for the heat sinks 400aa, 400ab, 400ac, 400b may include, but are not limited to, cooling fins or copper plates.

The present disclosure may provide a method of forming a semiconductor device for use in optoelectronic or photonic applications. The method may include forming a first thermally conductive layer above a substrate, forming a second thermally conductive layer above the substrate, in which the first thermally conductive layer and the second thermally conductive layer are electrically isolated, and forming an optoelectronic component above the substrate. The optoelectronic component may be formed as being laterally between the first thermally conductive layer and the second thermally conductive layer, and the optoelectronic component may be formed as being spaced apart from the first thermally conductive layer and the second thermally conductive layer.

The present disclosure may also provide another method of forming a semiconductor device for use in optoelectronic or photonic applications. The method may include forming a first plurality of thermally conductive layers above a substrate, forming a second plurality of thermally conductive layers above the substrate, in which the first plurality of thermally conductive layers and the second plurality of thermally conductive layers are electrically isolated, and forming an optoelectronic component above the substrate. The optoelectronic component may be formed as being laterally between the first plurality of thermally conductive layers and the second plurality of thermally conductive layers, and the optoelectronic component may be formed as being spaced apart from the first plurality of thermally conductive layers and the second plurality of thermally conductive layers. The thermally conductive layers in the respective first and second pluralities may be formed as being perpendicular to the optoelectronic component.

FIG. 16 through FIG. 20 show a set of steps that may be used to form a semiconductor device having the thermally conductive layers, such as the examples shown in FIG. 1B and FIG. 5B.

As used herein, "deposition techniques" refer to the process of applying a material over another material (or the substrate). Exemplary techniques for deposition include, but are not limited to, spin-on coating, sputtering, chemical vapor deposition (CVD), physical vapor deposition (PVD), molecular beam deposition (MBD), pulsed laser deposition (PLD), liquid source misted chemical deposition (LSMCD), atomic layer deposition (ALD).

Additionally, "patterning techniques" includes deposition of material or photoresist, patterning, exposure, development, etching, cleaning, and/or removal of the material or photoresist as required in forming a described pattern, structure or opening. Examples of techniques for patterning include, but are not limited to, wet etch lithographic processes, dry etch lithographic processes or direct patterning processes. Such techniques may use mask sets and resist layers.

Figure 16:
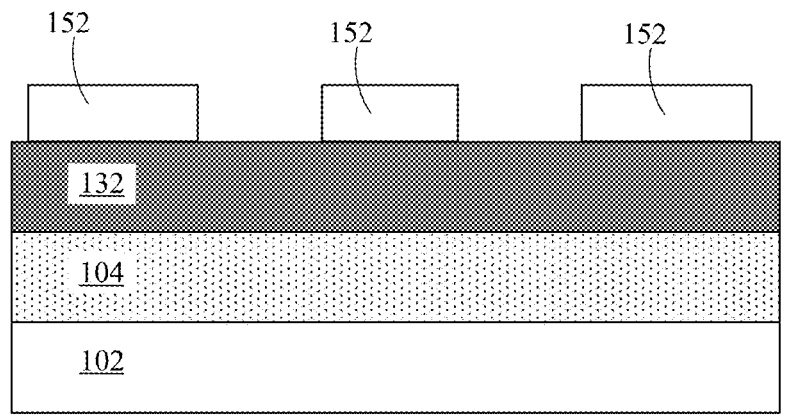
FIG. 16 through FIG. 20 are cross-sectional views of structures at various stages of forming a semiconductor device having thermally conductive layers.

Referring to FIG. 16, a semiconductor material 132 may be formed above a substrate 102. A buried insulator layer 104 may be formed on the substrate 102, and the semiconductor material 132 may be formed on the buried insulator layer 104. In an implementation, the semiconductor material 132 may be bonded to the buried insulator layer 104 or deposited on the buried insulator layer 104 using the deposition techniques described herein. The semiconductor material 132 may be subsequently patterned, using the patterning techniques described herein. During the patterning step, a patterned mask layer 152 may be deposited on the semiconductor material 132. The patterned mask layer 152 may mask sections of the semiconductor material 132, while unmasked or exposed sections of the semiconductor material 132 may be subsequently etched.

Figure 17:
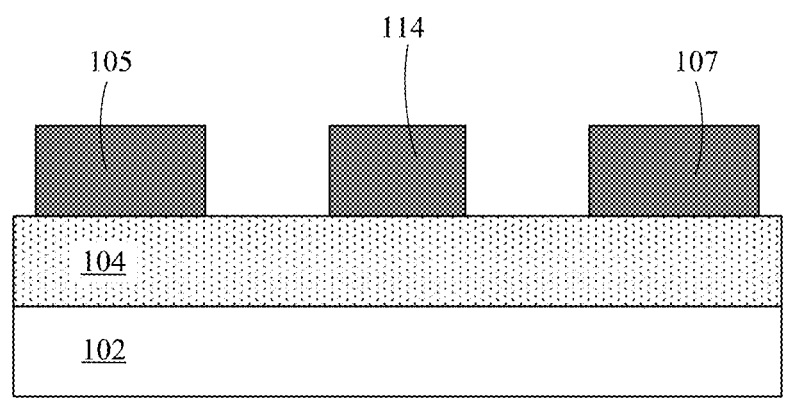

Referring to FIG. 17, the semiconductor material 132 may be etched to form an optoelectronic component 114 and semiconductor blocks 105, 107. Unmasked sections of the semiconductor material 132 may be etched and removed with an etching process, such as reactive ion etching. The etching process may be selected to stop on the material of the buried insulator layer 104 after penetrating fully through the deposited semiconductor material 132. Masked sections of the semiconductor material 132 are not etched and form the optoelectronic component 114 and the semiconductor blocks 105, 107. The patterned mask layer 152 may be removed after the etching.

Figure 18:
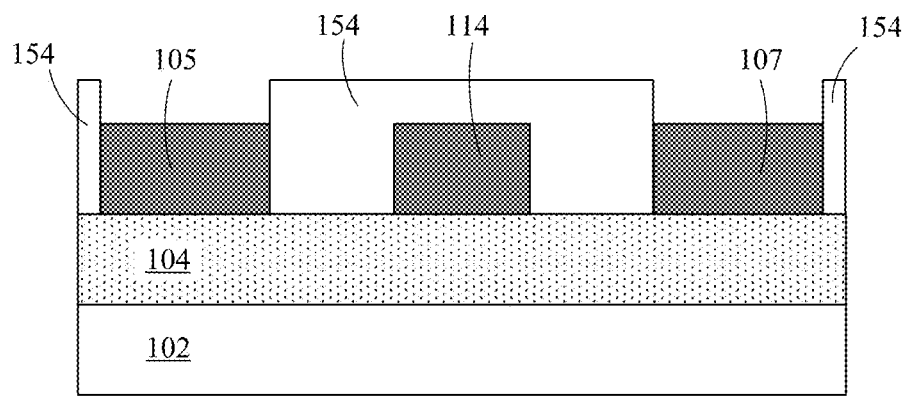

Referring to FIG. 18, a second patterned mask layer 154 may be deposited to mask the optoelectronic component 114. The patterned mask layer 154 may also be deposited to mask side surfaces of the semiconductor blocks 105, 107. The upper surface of the semiconductor blocks 105, 107 may be exposed or unmasked by the patterned mask layer 154.

Figure 19:
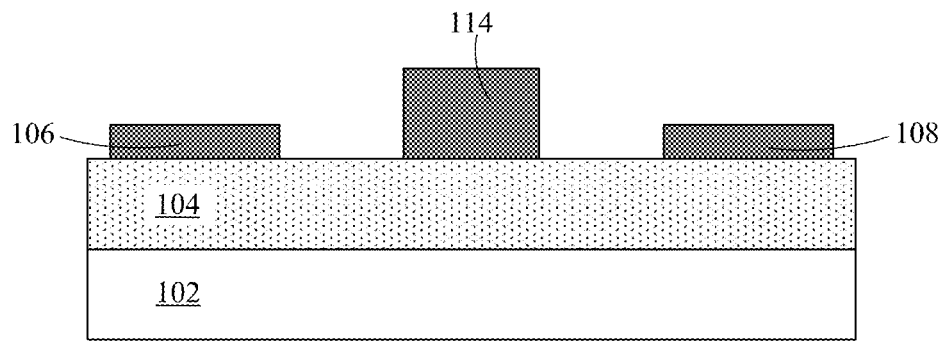

Referring to FIG. 19, a first semiconductor layer 106 and a second semiconductor layer 108 may be formed on the buried insulator layer 104. The exposed upper surface of the semiconductor blocks 105, 107 may be etched with an etching process, such as reactive ion etching. The etching process may decrease the thickness of the semiconductor blocks 105, 107. The etching may be stopped when the thickness of the semiconductor blocks 105, 107 reach a desired value. The etched semiconductor blocks 105, 107 may form the first semiconductor layer 106 and the second semiconductor layer 108, respectively. The patterned mask layer 154 may be removed after the formation of the semiconductor layers 106, 108.

Figure 20:
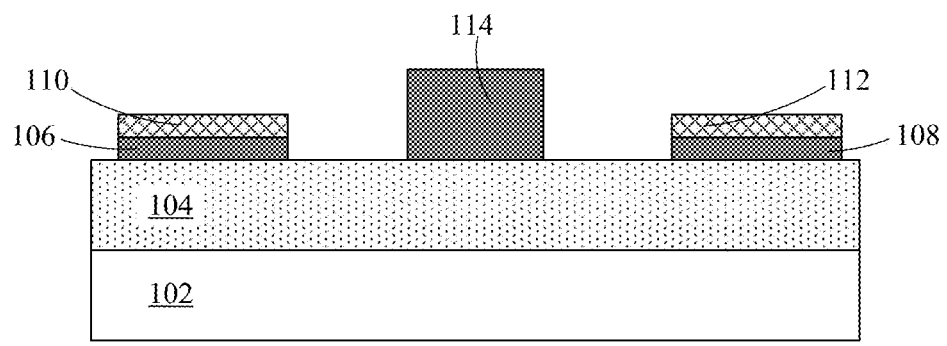

Referring to FIG. 20, a first thermally conductive layer 110 may be formed on the first semiconductor layer 106 and a second thermally conductive layer 112 may be formed on the second semiconductor layer 108. The thermally conductive layer 110, 112 may be formed by depositing or sputtering a metallic material (e.g., nickel, nickel-platinum alloy, titanium, or cobalt, etc.) on respective upper surfaces of the semiconductor layers 106, 108. A mask layer (not shown) may be formed on the optoelectronic component 114 to cover the optoelectronic component 114 and prevent the metallic material from forming on the surfaces of the optoelectronic component 114. An annealing process may be performed to form the thermally conductive layers 110, 112 from a reaction between the metallic material and the semiconductor layers 106, 108. The reaction between the metallic material and the semiconductor layers 106, 108 may produce a metal semiconductor compound. The annealing process may be conducted with a temperature range of about 200° C. to about 800° C., or preferably about 400° C. to about 550° C. In some implementations, the reaction between the metallic material and the semiconductor layers 106, 108 may be allowed to continue until all of the material in the semiconductor layers 106, 108 have reacted with the metallic material to produce the metal semiconductor compounds, resulting in the thermally conductive layers 110, 112 being formed on or directly on the buried insulator layer 104. After the formation of the metal semiconductor compounds, any unreacted metallic material is removed. The mask layer (not shown) formed to cover the optoelectronic component 114 is also removed.

FIG. 21 through FIG. 24 show another set of steps that may be used to form a semiconductor device having the thermally conductive layers, such as the example shown in FIG. 6B.

Figure 21:
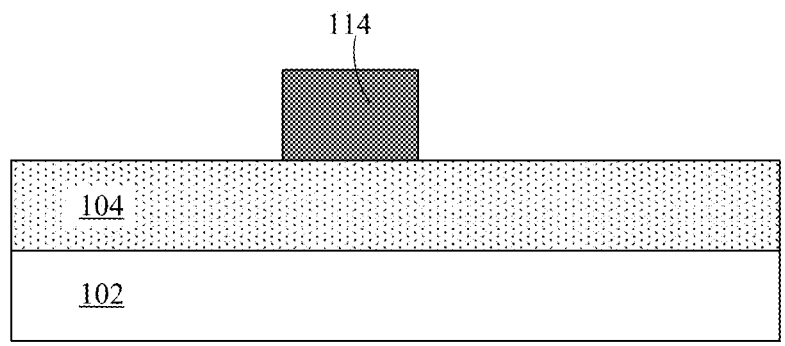
FIG. 21 through FIG. 24 are cross-sectional views of structures at various stages of forming another semiconductor device having thermally conductive layers.

Referring to FIG. 21 (FIG. 21 continues from the structure shown in FIG. 16), an optoelectronic component 114 may be formed on the buried insulator layer 104. The semiconductor material 132 may be patterned, using the patterning techniques described herein, to form the optoelectronic component 114. During the patterning of the semiconductor material 132, for example, a patterned mask layer 152 may be formed by a lithography process over the semiconductor material 132, and unmasked sections of the deposited semiconductor material 132 are etched and removed with an etching process, such as reactive ion etching. The etching process may be selected to stop on the material of the buried insulator layer 104 after penetrating fully through the deposited semiconductor material 132.

Figure 22:
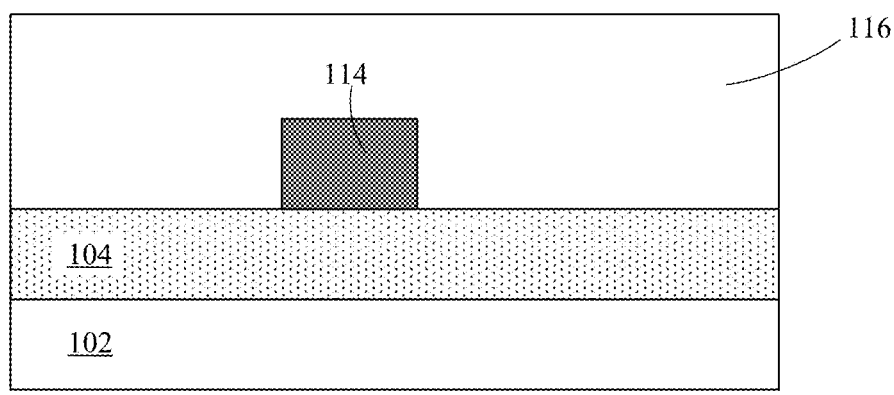

Referring to FIG. 22, a dielectric cladding material 116 may be formed on the optoelectronic component 114 and the buried insulator layer 104. The dielectric cladding material 116 may be formed using the deposition techniques described herein. The dielectric cladding material 116 may include a single or multiple layers of dielectric material described herein.

Figure 23:
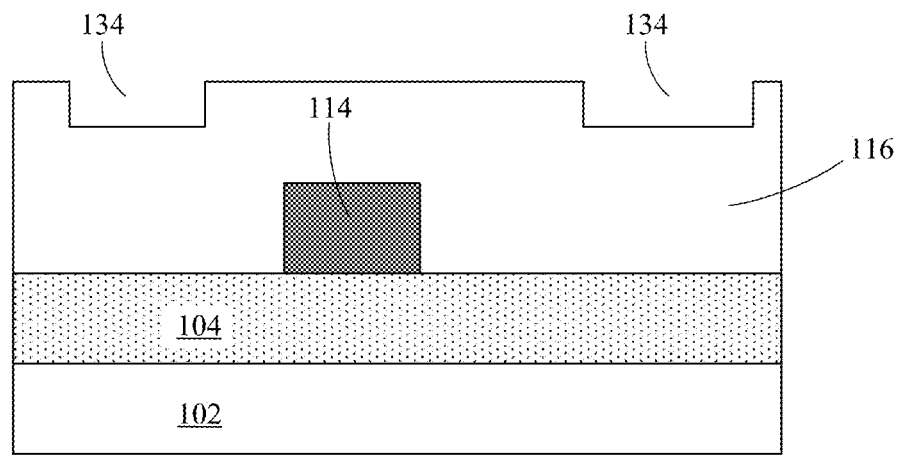
Figure 24:
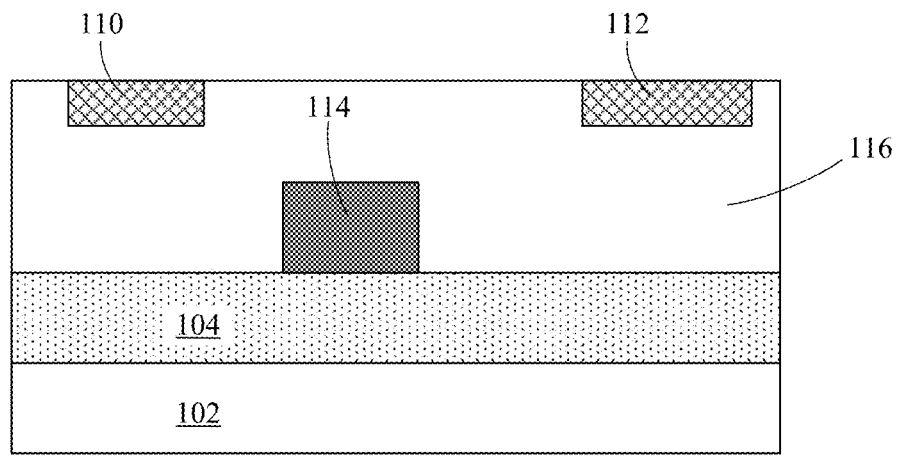

Referring to FIG. 23 and FIG. 24, the dielectric cladding material 116 may be patterned, using the patterning techniques described herein, to form openings 134 in the dielectric cladding material 116. A first thermally conductive layer 110 and a second thermally conductive layer 112 may be formed in the openings 134. For example, the openings 134 may be filled with a metal (e.g., copper or aluminum) using the deposition techniques described herein. In some implementations, the steps described in FIG. 23 and FIG. 24 may be performed during a middle end of line or a back end of line process of an integrated circuit chip. The formation of the thermally conductive layers 110, 112 may include the use of a damascene process.

Figure 25:
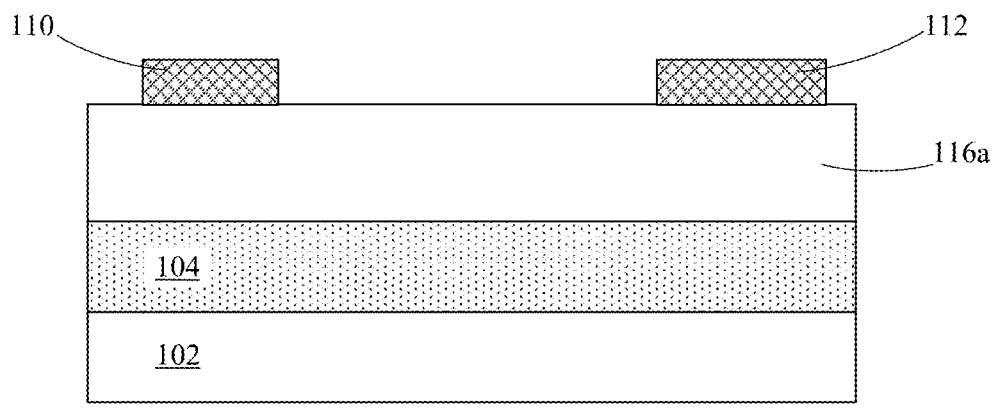
FIG. 25 through FIG. 27 are cross-sectional views of structures at various stages of forming yet another semiconductor device having thermally conductive layers.
Figure 26:
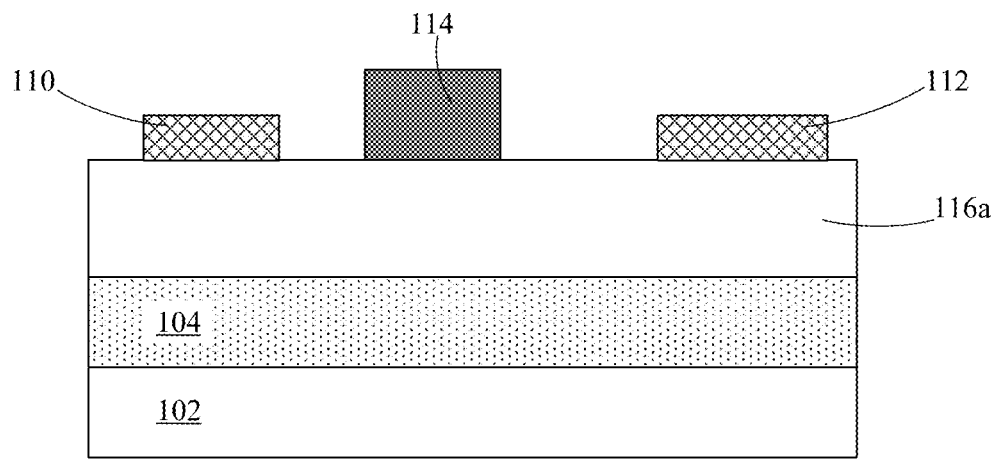
Figure 27:
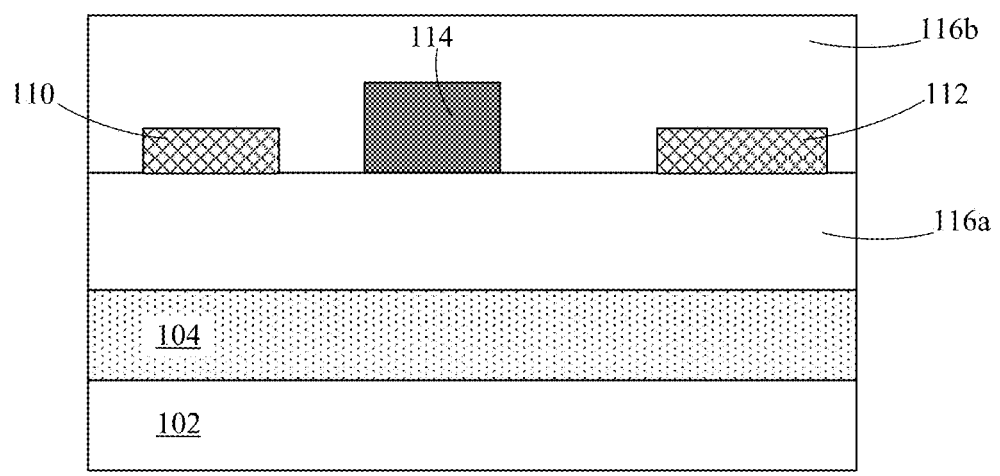

FIG. 25, FIG. 26, and FIG. 27 show yet another set of steps that may be used to form a semiconductor device having the thermally conductive layers, such as the example shown in FIG. 6C.

Referring to FIG. 25, a first dielectric cladding material layer 116a may be formed above a substrate 102. A buried insulator layer 104 may be formed on the substrate 102. In some implementations, FIG. 25 may continue from the structure shown in FIG. 16, in which the semiconductor material 132 may be removed (e.g., by etching) and the first dielectric cladding material layer 116a may be formed on the buried insulator layer 104. In alternative implementations (not shown), FIG. 25 may continue from the structure shown in FIG. 16, in which the semiconductor material 132 may be retained on the buried insulator layer 104. A first dielectric cladding material layer 116a may be formed on the semiconductor material 132.

Referring again to FIG. 25, in some implementations, the first dielectric cladding material layer 116a may be referred to as an inter-level dielectric region. The term "inter-level dielectric region" as used herein may refer to a region formed by the BEOL processing of an IC chip. The inter-level dielectric region may include interconnect features that provide routing or wiring of electrical signals across various components in the IC chip. A first thermally conductive layer 110 and a second thermally conductive layer 112 may be formed on the first dielectric cladding material layer 116a. The thermally conductive layer 110, 112 may be formed by depositing or sputtering a metal (e.g., copper or aluminum) on the first dielectric cladding material layer 116a material, followed by patterning of the deposited metal.

Referring to FIG. 26 and FIG. 27, an optoelectronic component 114 may be formed on the first dielectric cladding material layer 116a, using the deposition techniques described herein. A second dielectric cladding material layer 116b may be formed over the thermally conductive layers 110, 112, the optoelectronic component 114, and the first dielectric cladding material layer 116a, for example, using the deposition techniques described herein.

Throughout this disclosure, it is to be understood that if a method is described herein as involving a series of steps, the order of such steps as presented herein is not necessarily the only order in which such steps may be performed, and certain of the stated steps may possibly be omitted and/or certain other steps not described herein may possibly be added to the method. Furthermore, the terms "comprise", "include", "have", and any variations thereof, are intended to cover a non-exclusive inclusion, such that a process, method, article, or device that comprises a list of elements is not necessarily limited to those elements, but may include other elements not expressly listed or inherent to such process, method, article, or device. Occurrences of the phrase "in an embodiment" herein do not necessarily all refer to the same embodiment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Furthermore, there is no intention to be bound by any theory presented in the preceding background or the following detailed description. Additionally, the various tasks and processes described herein may be incorporated into a more comprehensive procedure or process having additional functionality not described in detail herein.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

As will be readily apparent to those skilled in the art upon a complete reading of the present application, the semiconductor devices and methods disclosed herein may be employed in manufacturing a variety of different integrated circuit products and modules, including, but not limited to, CMOS devices, optoelectronic modules, LIDAR instrumentation, and LIDAR systems, etc.

What is claimed is:

1. A semiconductor device comprising:
a first thermally conductive layer above a substrate;
a first semiconductor layer above a substrate, wherein the first thermally conductive layer is on the first semiconductor layer;
a second thermally conductive layer above the substrate, wherein the first thermally conductive layer and the second thermally conductive layer are electrically isolated;
a second semiconductor layer above the substrate, wherein the second thermally conductive layer is on the second semiconductor layer; and
an optoelectronic component above the substrate, the optoelectronic component is laterally between and spaced apart from the first semiconductor layer and the second semiconductor layer, the optoelectronic component is laterally between the first thermally conductive layer and the second thermally conductive layer, and the optoelectronic component is spaced apart from the first thermally conductive layer and the second thermally conductive layer.

2. The semiconductor device of claim 1, wherein the first thermally conductive layer and the second thermally conductive layer include a metal.

3. The semiconductor device of claim 1, wherein the first thermally conductive layer and the second thermally conductive layer include a metal semiconductor compound.

4. The semiconductor device of claim 1, wherein the first thermally conductive layer has a width and the second thermally conductive layer has a width, and the width of the first thermally conductive layer is the same as the width of the second thermally conductive layer.

5. The semiconductor device of claim 1, wherein the first thermally conductive layer has a width and the second thermally conductive layer has a width, and the width of the first thermally conductive layer is different from the width of the second thermally conductive layer.

6. The semiconductor device of claim 1, further comprising a dielectric cladding material over the optoelectronic component, the dielectric cladding material is laterally between the optoelectronic component and the first thermally conductive layer, and the dielectric cladding material is laterally between the optoelectronic component and the second thermally conductive layer.

7. The semiconductor device of claim 1, wherein the first thermally conductive layer and the second thermally conductive layer diverge away from the optoelectronic component.

8. The semiconductor device of claim 7, wherein the first thermally conductive layer and the second thermally conductive layer include bends that diverge away from the optoelectronic component.

9. The semiconductor device of claim 1, wherein the optoelectronic component is spaced apart from the first thermally conductive layer by a first spacing and the optoelectronic component is spaced apart from the second thermally conductive layer by a second spacing.

10. The semiconductor device of claim 9, wherein the optoelectronic component is a waveguide, the waveguide having an input end configured to receive an optical signal, and wherein the first spacing and the second spacing vary as a function of position relative to the input end of the waveguide.

11. The semiconductor device of claim 1, wherein the optoelectronic component is equidistant from the first thermally conductive layer and the second thermally conductive layer.

12. The semiconductor device of claim 1, wherein the optoelectronic component is a waveguide, the waveguide includes a bend, and wherein the first and second thermally conductive layers each include a bend that corresponds to the bend of the waveguide.

13. The semiconductor device of claim 1, wherein the optoelectronic component is a waveguide, the waveguide having an input end configured to receive an optical signal, and wherein the first thermally conductive layer and the second thermally conductive layer have widths that vary as a function of position relative to the input end of the waveguide.

14. The semiconductor device of claim 1, wherein the first semiconductor layer and the second semiconductor layer are of the same material.

15. The semiconductor device of claim 14, wherein the optoelectronic component is of the same material as the first semiconductor layer and the second semiconductor layer.

16. A semiconductor device comprising:
  a first plurality of thermally conductive layers above a substrate;
  a first plurality of semiconductor layers above a substrate, wherein each thermally conductive layer in the first plurality of thermally conductive layers is on each semiconductor layer in the first plurality of semiconductor layers;
  a second plurality of thermally conductive layers above the substrate, wherein the first plurality of thermally conductive layers and the second plurality of thermally conductive layers are electrically isolated;
  a second plurality of semiconductor layers above the substrate, wherein each thermally conductive layer in the second plurality of thermally conductive layers is on each semiconductor layer in the second plurality of semiconductor layers; and
  an optoelectronic component above the substrate, the optoelectronic component is laterally between and spaced apart from the first plurality of semiconductor layers and the second plurality of semiconductor layers, the optoelectronic component is laterally between the first plurality of thermally conductive layers and the second plurality of thermally conductive layers, and the optoelectronic component is spaced apart from the first plurality of thermally conductive layers and the second plurality of thermally conductive layers.

17. The semiconductor device of claim 16, wherein the optoelectronic component is a waveguide, the waveguide is elongated and having a longitudinal length.

18. The semiconductor device of claim 17, wherein the first plurality of thermally conductive layers and the second plurality of thermally conductive layers are elongated and having longitudinal lengths, and the longitudinal lengths of the thermally conductive layers in the first and second pluralities are perpendicular to the longitudinal length of the waveguide.

* * * * *